United States Patent [19]

Fahley

[11] 4,363,239

[45] Dec. 14, 1982

[54] LIQUID GAGING SYSTEM CONTAMINATION MONITOR

[75] Inventor: Jerome A. Fahley, Fridley, Minn.

[73] Assignee: Honeywell Inc., Minneapolis, Minn.

[21] Appl. No.: 149,790

[22] Filed: May 14, 1980

[51] Int. Cl.³ .............................................. G01F 23/26
[52] U.S. Cl. .................................................. 73/304 C
[58] Field of Search ............. 73/304 C; 364/442, 509; 318/642; 324/61 R, 61 P

[56] References Cited

U.S. PATENT DOCUMENTS

| | | | |
|---|---|---|---|
| 2,460,773 | 2/1949 | Stimson | 73/304 C |
| 2,519,668 | 8/1950 | Konigsberg | 73/304 C |
| 2,601,176 | 2/1952 | Smith | 73/304 C |
| 2,968,181 | 1/1961 | Mittelman | 73/304 C |
| 3,361,897 | 1/1968 | Rush | 364/442 |
| 3,463,980 | 8/1969 | Cohn et al. | 73/304 C |
| 3,523,186 | 8/1970 | Cohn et al. | 318/642 |
| 3,797,311 | 3/1974 | Blanchard et al. | 73/304 C |
| 3,830,090 | 8/1974 | Hersch et al. | 73/304 R |
| 3,935,741 | 2/1976 | Zinsmeyer et al. | 73/313 |
| 4,055,995 | 11/1977 | Armstrong et al. | 73/116 |
| 4,079,627 | 3/1978 | Gundlach | 73/313 |
| 4,083,248 | 4/1978 | Maier | 73/304 C |
| 4,090,408 | 5/1978 | Hedrick | 73/304 C |
| 4,114,442 | 9/1978 | Pratt | 73/341 |
| 4,118,772 | 10/1978 | Takada | 364/119 |
| 4,164,146 | 8/1979 | DuVall et al. | 73/304 R |
| 4,173,893 | 11/1979 | Hedrick | 73/304 C |
| 4,181,958 | 1/1980 | Juengel et al. | 364/560 |
| 4,212,064 | 7/1980 | Forsythe et al. | 364/424 |
| 4,215,404 | 7/1980 | Bukhiyarov et al. | 364/431 |
| 4,229,798 | 10/1980 | Rosie et al. | 364/564 |
| 4,258,422 | 3/1981 | Dougherty et al. | 73/304 C |
| 4,263,652 | 4/1981 | Henrich | 73/1 G |
| 4,266,144 | 5/1981 | Bristol | 73/304 C |
| 4,275,382 | 6/1981 | Jannotta | 340/151 |

Primary Examiner—Stephen A. Kreitman
Attorney, Agent, or Firm—John P. Sumner

[57] ABSTRACT

The present invention is part of a liquid gaging system and comprises an apparatus for monitoring a quadrature signal from a capacitor sensor. Included is a capacitive sensor for providing a liquid measurement signal related to a liquid in a tank, the liquid measurement signal comprising a capacitive signal and a quadrature signal. The invention also includes apparatus for monitoring the quadrature signal through null detection of the capacitive signal, the null detection being implemented through a rebalance approximation sequence. The apparatus for monitoring is connected to the sensor.

46 Claims, 16 Drawing Figures

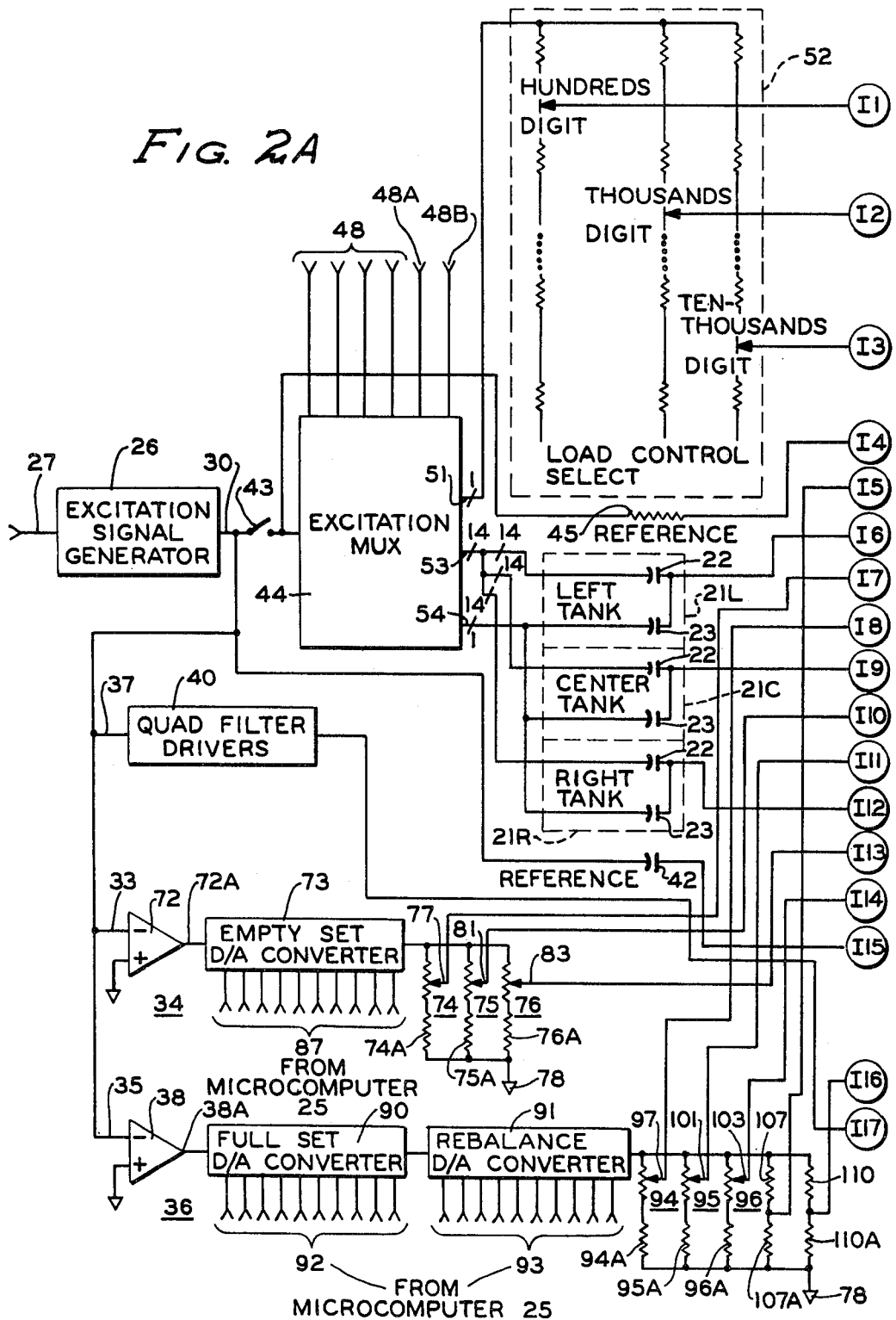

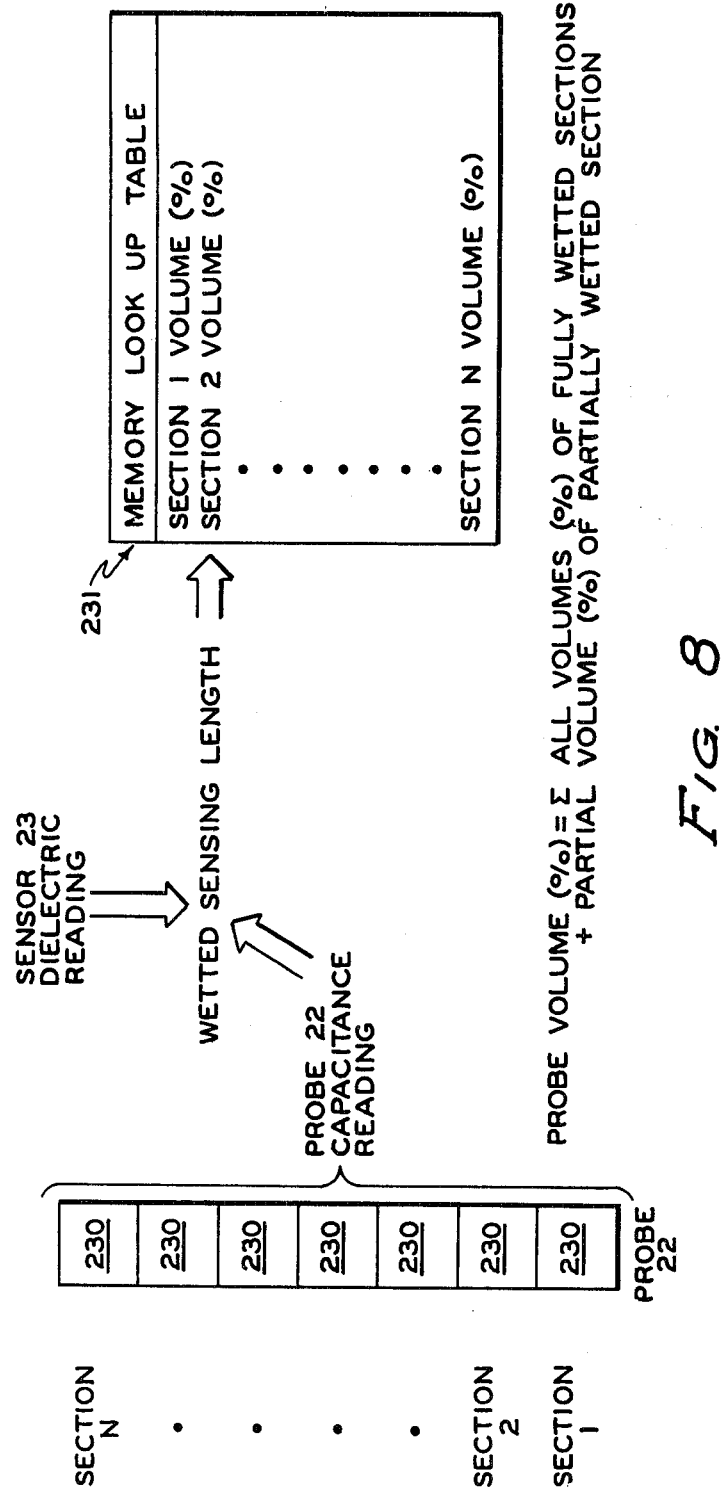

LIQUID GAGING SYSTEM CONTAMINATION MONITOR

CROSS REFERENCES TO RELATED APPLICATIONS

Reference is made to a co-pending application entitled "Liquid Gaging System" by W. R. Dougherty, D. D. Colby, and M. J. van Dyke, Ser. No. 036,119, filed May 4, 1979, and assigned to the same assignee as this application (now U.S. Pat. No. 4,258,422).

Reference is also made to a co-pending application entitled "Low Radiation Densitometer" by R. J. Borken, Ser. No. 081,962, filed Oct. 4, 1979, and assigned to the same assignee as this application (now U.S. Pat. No. 4,277,681).

Reference is further made to the following co-pending applications which were filed on May 14, 1980 and are assigned to the same assignee as this application:

"Liquid Gaging System Compatible With Multiple Characterization of Each Sensor" by M. J. van Dyke, D. D. Colby, and W. R. Dougherty, Ser. No. 149,795

"Digital Characterization of Liquid Gaging System Sensors" by D. D. Colby, M. J. van Dyke, and W. R. Dougherty, Ser. No. 149,772

"Liquid Gaging System Null Balance Circuitry" by M. J. van Dyke and J. A. Fahley, Ser. No. 149,789, now U.S. Pat. No. 4,350,039, "Liquid Gaging System Multiplexing" by W. R. Dougherty, D. D. Colby, J. A. Fahley, and M. J. van Dyke, Ser. No. 149,798

"Liquid Gaging System Self Test Circuitry" by K. Leonard, D. D. Colby, W. R. Dougherty, J. A. Fahley, and M. J. van Dyke, Ser. No. 149,797, now U.S. Pat. No. 4,337,638, "Liquid Gaging System Lost Sensor Recovery" by D. D. Colby, Ser. No. 149,773, now U.S. Pat. No. 4,352,159, "Liquid Gaging System Sensor Calibration" by W. R. Dougherty, Ser. No. 149,796

BACKGROUND OF THE INVENTION

The present invention relates to a microcomputer-controlled system for measuring the volume or quantity of liquid in one or more tanks. Although the present invention has application in a variety of liquid gaging systems, it will be described in the context of an aircraft fuel gaging system.

In the aircraft industry, a basic sensor for measuring fuel volume or quantity has long been the capacitance sensor which has been accepted for many years as a rugged, reliable device. In the above mentioned co-pending application filed on May 4, 1979 (application Ser. No. 036,119), a system was described which provided significant improvement in the sensor accuracy of liquid gaging systems, including systems for measuring aircraft fuel volume or quantity with capacitive sensors. As with the present system, the system described in application Ser. No. 036,119 achieves improved sensor gaging accuracy and flexibility by use of a microcomputer or similar device to provide tank shape and volume, tank or aircraft attitude, and similar characterization which in the prior art was formerly only approximated by means of physically characterized (shaped) fuel gage probes.

In this manner, like the liquid gaging system described in application 036,119, the present system provides a number of significant advantages over conventional liquid gaging systems. These advantages include the need for a fewer number of sensors or probes in each tank, simplified probe construction by elimination of physical characterization, improved system accuracy by characterizing for tank geometry and tank or airplane attitude in a microcomputer or other digital system, reduced system weight by decreasing the number of probes, and simplified installation for the aircraft manufacturer by requiring fewer probes. Digital characterization also provides a more flexible design which can accommodate tank changes with minor hardware impacts.

The present system was developed to provide a liquid gaging system having even greater accuracy and flexibility than previously disclosed systems. One feature of the present system providing significant additional accuracy and flexibility is the individual measurement of the wetted length of each probe. This is in contrast to typical prior art systems and the system described in application 036,119 wherein the total wetted length of all probes in a particular tank is measured and used for determination of liquid volume or quantity. Thus, in the system described in application 036,119, a wetted length signal related to the portion of all probes in a tank wetted by the liquid is used in conjunction with data stored in attitude tables for determining liquid volume or quantity in a tank.

In contrast, one advantage of the present system is that no attitude sensor is required, and no signal need be received by the system to separately indicate the attitude of the tank or aircraft. Elimination of an attitude sensor is made possible in part through the previously mentioned individual monitoring of the wetted length of each probe. Knowing the individual wetted length of each probe, the determination of fuel volume or quantity can be made through stored data having the effects of attitude, tank geometry, the number and location of the probes, and similar factors already included. Thus, the present system provides the basis for significant simplification over systems requiring attitude sensors since attitude sensors with sufficient precision and reliability are complex and expensive. Accordingly, the present system provides the basis for improving reliability and reducing maintenance requirements.

The present system also provides significantly increased accuracy over the accuracy of systems available in the prior art. In the preferred embodiment, each probe in the present system is divided into theoretical sections having a length, and at least one characterization table corresponding to each probe is used with data related to the theoretical sections and the wetted length of the probe to directly determine fuel volume or quantity. By having a plurality of characterization tables corresponding to each probe, multiple characterizations governing various conditions can be used. Thus, for example, there can be separate characterizations for ground and flight conditions and for separate ranges of liquid volume or quantity. As will be further discussed in this application, such multiple characterization of each probe can significantly increase system accuracy.

In addition, prior art systems compatible with individual monitoring of physically characterized probes can be retrofitted with the present system in order to provide multiple characterization of each probe, thereby significantly increasing the accuracy of the such systems.

The present system also incorporates digital null balance circuitry and a rebalance approximation sequence which provides a high-speed reading means for very quickly and accurately determining the capacitance of each sensor as the sensors are individually monitored. The digital null balance circuitry in the present system is in contrast to relatively slow prior art circuitry using means such as up-down counters to monitor a reading. A high-speed accurate system is of substantial advantage since, for example, in an aircraft fuel gaging system, a relatively short probe could very quickly go from being 100 percent wetted to being completely unwetted. In such a situation, the relatively slow prior art reading means would be incompatible with multiplexed probe readings such as those in the present system.

Another advantage of the present system is its ability to monitor or fault isolate various components for malfunction. For example, through a contamination monitor and related circuitry, each probe and dielectric sensor may be monitored for two levels of contamination, a first level indicating that the component is becoming contaminated but is still useable and a second level indicating the component is no longer useful.

Another example of the fault isolation capabilities of the present system relates to two precision reference components, a reference resistor and a reference capacitor, each of which is driven by the system excitation signal generator. By monitoring the current through the reference resistor using the null balance circuitry, a primary check of the excitation signal level is obtained, and a secondary check of the null detecting circuitry is made. By monitoring the excitation signal through the reference resistor via the contamination monitor, a primary check of the contamination monitor is made, and a secondary check of the excitation signal level is obtained. By monitoring the current through the reference capacitor, a primary check of the excitation signal frequency is obtained, and a secondary check of the null detecting circuitry is made.

A still further advantage of the present system relates to elimination of a significant portion of the additional error introduced by complete loss of a probe such as when a single capacitive probe is disabled and provides a zero capacitance reading or when a probe is determined unusable by the contamination monitor. In a preferred embodiment of the present system, one or more sister probes are identified for each probe and used to estimate a failed probe's wetted sensing length. In this manner, if a probe does malfunction completely, substantially less precision is lost than in typical prior art systems under such circumstances.

An even further advantage of the present system is that, since individual probes are monitored for wetted sensing length, individual capacitive probes can be monitored while unwetted in order to determine their true unwetted capacitance, including any stray capacitance introduced during installation. Combined with a storage device such as an electrically programmable read-only memory (EPROM), monitoring individual capacitive probes while unwetted allows exact empty capacitances to be stored in the microcomputer for use in making extremely precise liquid volume or quantity determinations. The feature is particularly applicable upon installation of a system or after an overhaul during which additional or different stray capacitances may have been introduced.

SUMMARY OF THE INVENTION

The present invention is part of a liquid gaging system and comprises an apparatus for monitoring a quadrature signal from a capacitive sensor. Included is a capacitive sensor for providing a liquid measurement signal related to a liquid in a tank, the liquid measurement signal comprising a capacitive signal and a quadrature signal. The invention also includes apparatus for monitoring the quadrature signal through null detection of the capacitive signal, the null detection being implemented through a rebalance approximation sequence. The apparatus for monitoring is connected to the sensor.

BRIEF DESCRIPTION OF THE DRAWINGS

FIGS. 2A and 2B comprise a block diagram of analog-to-digital (A/D) electronics compatible with the present invention.

FIG. 8 facilitates explanation of fuel volume determination in the present system.

DESCRIPTION OF THE PREFERRED EMBODIMENTS

System Overview

As was previously indicated, the present invention relates to a microcomputer-controlled system for measuring the liquid volume or quantity in one or more tanks. The present application describes the entire electrical system and all of the various functions of the system in order to permit a complete appreciation of the various functions and activities within the system. As a result, there are described in this application various features and functions of the liquid gaging system which are not the subject of the present invention but rather are the subject of inventions claimed in the previously mentioned co-pending applications filed concurrently with this application. The description of these features and functions are included in the present application for the sake of completeness and to permit the reader a full appreciation of the operation of the liquid gaging system disclosed.

Figure 1:
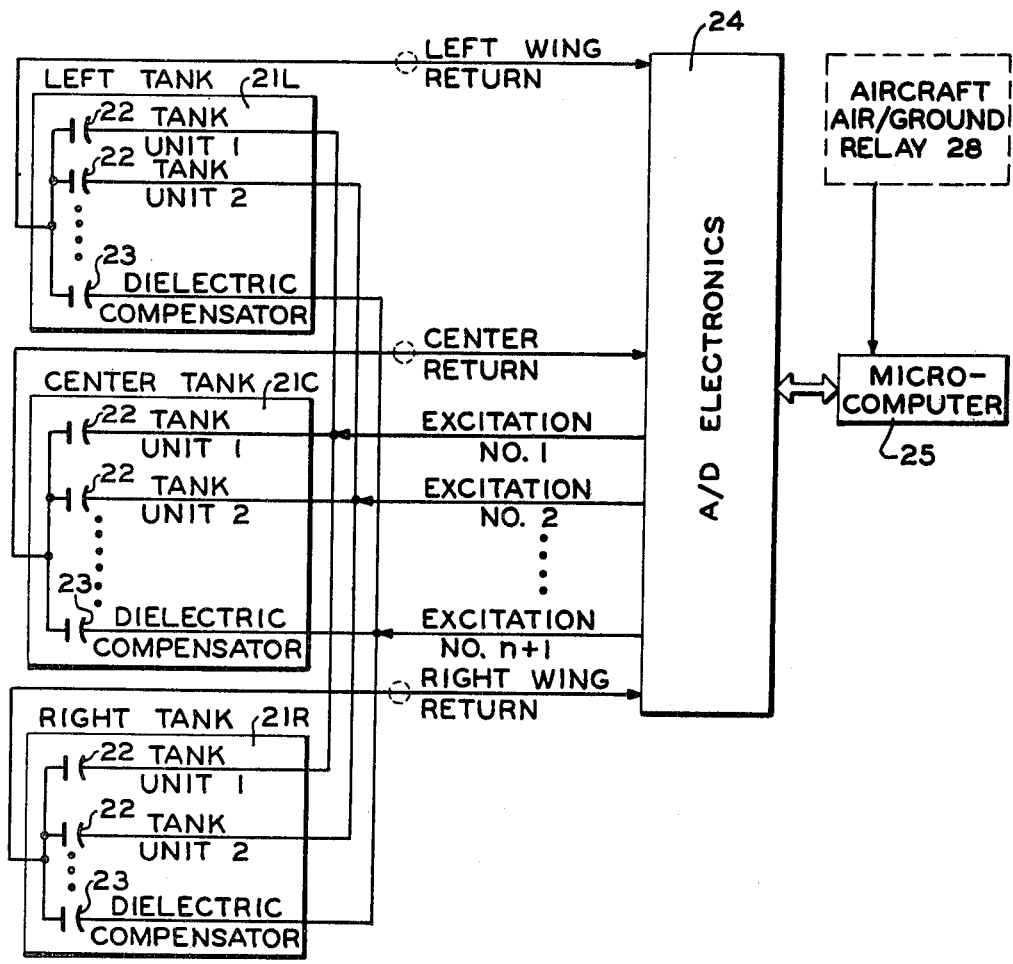
FIG. 1 is a block diagram of a liquid gaging system comprising the present invention.

The embodiment of the present system illustrated in FIG. 1 comprises a section of analog-to-digital (A/D) electronics 24, a microcomputer 25, and three tanks which, for example, could comprise a left wing tank 21L, a center tank 21C, and a right wing tank 21R of an aircraft.

For each tank to be monitored, the liquid gaging system includes one or more probes 22, each probe providing a wetted sensor length signal variable in dependence on the portion of the probe immersed in liquid. Probes 22 may be of the capacitive type or may be any type of probe compatible with the present invention. In the alternative, probes 22 may be replaced by any type of sensor for providing information relative to a liquid level or depth at a particular location in a tank. A plurality of probes for a tank may be referred to as a probe system. Likewise, a plurality of sensors for a tank may be referred to as a sensor system.

Capacitive probes typically have a capacitance variable in dependence on the portion of the probe immersed in liquid and on the dielectric constant of the liquid. Consequently, if capacitive probes are used, a system incorporating the present invention would normally comprise at least one dielectric compensator or sensor 23 for measuring the dielectric constant of the liquid. The system shown includes a dielectric sensor 23 in each tank since the liquid in various tanks may vary in dielectric constant due, for example, to differences in liquid mixture or temperature.

A primary purpose of A/D electronics 24 is to convert an analog signal from each probe 22 and dielectric sensor 23 into an accurate binary word. In the case of each probe 22, the binary word in the system disclosed represents a capacitance added to the probe by the liquid. In the case of each dielectric sensor 23, the binary word is related to the dielectric constant of the liquid.

The functions of microcomputer 25 include controlling A/D electronics 24 and, together with A/D electronics 24, generating the binary numbers representing liquid volume or quantity in the tank or tanks of interest. Although the present system is controlled almost exclusively through a microcomputer 25, it is also possible to provide control through sequencers or other electronics. Microcomputer 25 also serves as means for receiving signals or data from an aircraft air/ground relay 28, the signals or data being related to whether the aircraft is in the air or on the ground.

Readout of fuel volume or quantity in each tank or within all tanks may be provided through conventional digital drive electronics and indicators (not shown).

Depending upon the requirements of a particular liquid gaging system, it may be desirable to include more than one channel of A/D electronics 24 and/or more than one microcomputer 25. Thus, a liquid gaging system could comprise two or more channels of A/D electronics 24 and/or microcomputers 25. In such a system, the channels can be redundant, each performing the same task, one serving as backup for the other. Alternatively, each channel can simultaneously perform completely independent functions or measurements, with the further operation of each channel being available as backup for the other(s) under predetermined conditions or failure modes.

In operation of the present system as disclosed, probes and dielectric sensors are sequentially scanned in order to determine the capacitance of each probe and the dielectric constant of the fuel.

Using the measured probe capacitances and the value of the fuel dielectric constant, a value of wetted sensing length is determined for each probe. The wetted sensing length of each probe is then converted to a measure of partial fuel volume corresponding to the probe. The partial fuel volumes computed for each probe are then summed to obtain a total fuel volume for each tank.

If fuel quantity in weight such as pounds is desired as opposed to fuel volume such as gallons, fuel density may be determined through the measured dielectric constant, as further discussed elsewhere in this application. Alternatively, fuel density may be determined by any other density sensor meeting system accuracy requirements. Total fuel quantity in each tank may then be calculated by multiplying fuel volume times fuel density for each tank. Total fuel quantity on board the aircraft may then be computed from the sum of the individual tank fuel quantity determinations.

A/D Electronics Overview

Figure 2B:
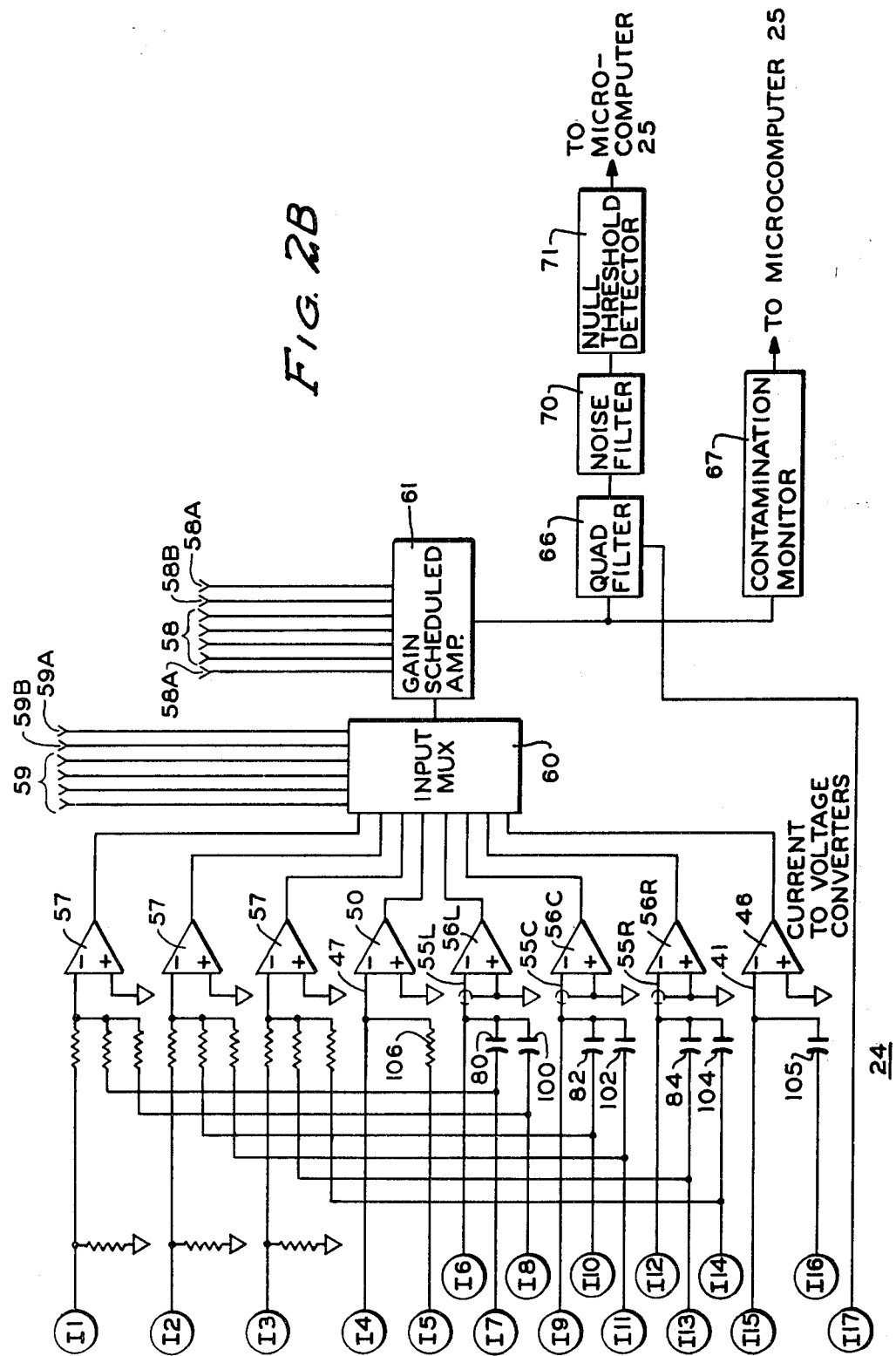

A preferred embodiment of A/D electronics 24 is illustrated in the block diagram of FIGS. 2A and 2B and is further detailed in the schematic diagram of FIGS. 3A through 3F. In these figures, like-numbered terminals, e.g., 11 in FIGS. 2A and 2B, are connected.

Referring to FIGS. 2A and 2B, it can be seen that A/D electronics 24 comprises an excitation signal generator 26, an excitation multiplexer 44, and an input multiplexer 60. Excitation signal generator 26 provides an excitation signal to various components including probes 22 and dielectric sensors 23. Excitation multiplexer 44 controls application of the excitation signal to probes 22 and dielectric sensors 23. Input multiplexer 60 controls selection of various measurements, including liquid measurements related to the individual tanks.

A/D electronics 24 also comprises a null threshold detector 71, empty reference circuitry 34, and full reference circuitry 36. These components together with associated circuitry are used to make various system measurements through digital null balancing.

Also included are quadrature filter drivers 40, a quadrature filter 66, and a contamination monitor 67. Together with drivers 40, quadrature filter 66 filters the quadrature or resistive component of each liquid measurement signal in order to measure the true capacitive value of the signal. Contamination monitor 67 checks probe and dielectric sensor contamination and can be used to determine if the amplitude of the excitation signal provided by excitation signal generator 26 is above a predetermined level.

A key feature of the present system is that each probe 22 and each dielectric sensor 23 is individually monitored. In any one channel of the system shown, this individual monitoring is accomplished through simultaneous excitation of one probe 22 or dielectric sensor 23 in each tank while at the same time monitoring only one tank at a time for liquid measurement.

In the preferred embodiment, individual probes 22 and dielectric sensors 23 are selected for measurement by means of excitation multiplexer 44 and input multiplexer 60. Each of these multiplexers is controlled by signals received through a plurality of second inputs, numbers 48, 48A and 48B corresponding to excitation multiplexer 44 and numbers 59, 59A, and 59B corresponding to input multiplexer 60. In any one channel of the A/D electronics 24 preferred embodiment, excitation multiplexer 44 switches the excitation signal provided by excitation signal generator 26 to the low impedance electrode of one probe 22 or dielectric sensor 23 in each tank or to load control select 52. (Load control select 52 relates to control of liquid quantity to be put in a tank and does not directly relate to the present invention. Accordingly, it will not be discussed in detail in this application). Excitation multiplexer 44 also simultaneously grounds all low impedance electrodes not receiving the excitation signal. Lines 51, 53, and 54 leading from multiplexer 44 are labeled with a slash (/) and a corresponding number (e.g. 14) to indicate the number of lines involved. For example, the slash and number 14 on lines 53 indicate 14 lines, each line leading to one of 14 probes 22 in each tank. Similarly, the slash and number one (1) associated with line 54 indicates one line leading to a dielectric sensor 23 in each tank. Likewise, the slash and number one associated with line 51 indicates one line leading to load control select 52. Similar nomenclature is used elsewhere in this application (e.g., see FIG. 3F).

The high impedance electrode of each probe 22 and dielectric sensor 23 are commoned for each tank and connected to an input amplifier for each tank. These amplifiers, numbers 56L, 56C, and 56R corresponding to tanks 21L, 21C, and 21R respectively, function as current to voltage converters. Each amplifier 56L, 56C, and 56R has its own connection to input multiplexer 60 which individually selects one amplifier at a time for liquid measurement.

Obtaining a liquid measurement in a particular tank of interest relates to obtaining a null at the input of the amplifier corresponding to the tank. Thus, if a measurement is being made on a probe 22 in tank 21L, a null is obtained at input 55L of amplifier 56L. Similarly, if a measurement is being made through amplifier 56C or 56R, a null is obtained at input 55C or 55R, respectively. As indicated above, and as will be further explained below, these nulls are detected through circuitry comprising null threshold detector 71, empty reference circuitry 34, and full reference circuitry 36.

In understanding the operation of the null detecting and associated circuitry, it may be convenient to think of the capacitance of a particular probe 22 or dielectric sensor 23 as comprising two separate values, a first value related to the dry or unwetted capacitance of the probe or sensor and a second value related to the capacitance added to the probe or sensor by the liquid.

In balancing the current provided by a particular probe 22 or dielectric sensor 23, the circuitry of the embodiment illustrated separately provides a current to balance the current associated with the dry or unwetted capacitance of the probe or dielectric sensor and a current to balance the current associated with the capacitance added by the liquid to the probe or dielectric sensor.

Accordingly, empty reference circuitry 34 provides the current to balance the dry or unwetted capacitance of the probe 22 or dielectric sensor 23 of interest. The current provided by empty reference circuitry 34 is provided through an empty reference capacitor corresponding to the particular tank or amplifier associated with the probe 22 or dielectric sensor 23 being monitored.

Similarly, during the monitoring of a particular probe 22 or dielectric sensor 23, full reference circuitry 36 provides current to balance the current associated with the capacitance added to the probe or dielectric sensor by the liquid. During such a measurement, current provided by full reference circuitry 36 is provided through a full reference capacitor corresponding to the particular tank or amplifier associated with the probe or dielectric sensor being monitored.

Empty Reference circuitry 34

As was previously indicated, the purpose of empty reference circuitry 34 is to provide a particular current to the input of an amplifier corresponding to the tank containing the probe 22 or dielectric sensor 23 of interest. The current provided will balance the current associated with the dry or unwetted capacitance of the probe or dielectric sensor being monitored.

Empty set circuitry 34 comprises an amplifier 72 driven by excitation signal generator 26. Within circuitry 34, an output 72A of amplifier 70 is coupled to an empty set digital-to-analog (D/A) converter 73 which, together with an amplifier 79 (FIG. 3A), provides at an output 79A a voltage that is opposite in phase to that provided by output 30 of generator 26. Circuitry 34 also includes three empty adjust potentiometers 74, 75, and 76. These potentiometers could be replaced in appropriate circumstances by fixed voltage dividers comprising resistors.

Amplifier 72, which may comprise an LF156, serves to provide an empty reference voltage to D/A converter 73. In the embodiment shown, D/A converter 73 is a ten-bit unit and may comprise a 7520UD. Amplifier 79, which may also comprise an LF156, is used with D/A converter 73 to provide a voltage output since a 7520UD does not include an amplifier on the chip. Converter 73 provides empty set attenuation means and includes a plurality of second inputs 87 for receiving empty set or attenuation control signals from microcomputer 25. Converter 73 provides predetermined attenuation dependent upon which second inputs 87 are enabled by the attenuation control signals.

When the most significant bit (MSB) of converter 73 is enabled, the converter passes half of the input signal. For a 10 bit converter, each bit of lesser significance, when enabled by itself, permits converter 73 to pass $\frac{1}{4}$, $\frac{1}{8}$, 1/16, 1/32, 1/64, 1/128, 1/256, 1/512, and 1/1024 respectively of the current entering the converter. Thus, if the first three most significant bits are enabled, 87.5% of the current is passed ($\frac{1}{2}+\frac{1}{4}+\frac{1}{8}=0.875$), and if all bits are enabled, substantially all current passes. Therefore, by enabling appropriate inputs of converter 73, predetermined, highly precise attenuation factors can be selected.

Empty adjust potentiometers 74, 75, and 76 correspond to tanks 21L, 21C, and 21R respectively and to three empty reference capacitors 80, 82, and 84 respectively. The current provided by empty reference circuitry 34 is provided through an empty reference capacitor corresponding to a particular tank.

As is explained further below, when a particular tank is being monitored for liquid measurement, the current flowing through the appropriate empty reference capacitor is set to be equal in magnitude but opposite in phase to the current flowing through the unwetted probe 22 or dielectric sensor 23 of interest.

During initial set up of a system, each empty adjust potentiometer (or other suitable voltage divider) is set (sized) to balance the current flowing through its corresponding empty reference capacitor with the current flowing through the largest capacitance probe 22 in the corresponding tank while the probe is dry or unwetted.

The adjustment is accomplished using a product of voltage and capacitance, the product being proportional to current. Each empty adjustment potentiometer is set so that the product of the empty reference voltage provided by amplifier 72 and the capacitance of the corresponding empty reference capacitor is equal to the product of the excitation signal voltage provided by excitation signal generator 26 and the empty or unwetted capacitance of the corresponding largest probe 22.

Accordingly, empty adjust potentiometer 74 is set so that the product of the empty reference voltage provided by amplifier 72 and the capacitance of empty reference capacitor 80 is equal to the product of the excitation signal voltage provided by excitation signal generator 26 and the empty or unwetted capacitance of the largest probe 22 in tank 21L. Similarly, empty adjust potentiometers 75 and 76 are set so that the product of the empty reference voltage and the capacitance of empty reference capacitors 82 and 84 respectively are equal to the product of the excitation signal voltage and the empty or unwetted capacitance of the largest probe 22 in tanks 21C and 21R respectively.

Resistors 74A, 75A, and 76A serve as voltage dividers so that the entire voltage drop is not accomplished by the resistors in potentiometers 74, 75, and 76. In this manner a greater sensitivity to the potentiometer adjustments is provided.

Thermistors 74B, 75B, and 76B (FIG. 3A) provide compensation to offset the fixed temperature coefficients of empty reference capacitors 80, 82, and 84 respectively.

Whenever input multiplexer 60 selects the largest probe 22 in a tank for measurement, all second inputs 87 of empty set D/A converter 73 are enabled so that converter 73 provides the empty reference voltage without substantial attenuation. During such a measurement, the current flowing through the corresponding empty reference capacitor balances the current that would flow through the corresponding largest probe while unwetted.

However, if a measurement is being made on a probe 22 other than a probe having the largest unwetted capacitance or on an unwetted dielectric sensor 23, the current flowing through the corresponding empty reference capacitor will be larger than the current corresponding to the unwetted capacitance of the probe or sensor unless an appropriate attenuation is provided by empty set D/A converter 73. Thus, whenever such a measurement is selected, microcomputer 25 provides appropriate attenuation control signals to second inputs 87, there being stored in a memory of microcomputer 25 an empty set attenuation factor for each probe and dielectric sensor. With the appropriate attenuation enabled, the current provided to the corresponding input amplifier by the applicable empty reference capacitor will be the current corresponding to the unwetted capacitance of the probe 22 or dielectric sensor 23 being monitored.

Full Reference Circuitry 36

As was previously indicated, the purpose of full reference circuitry 36 is to provide a particular balancing current to the input of an amplifier of interest.

Full reference circuitry 36 comprises an amplifier 38 driven by excitation signal generator 26. Circuitry 36 also comprises a full set digital-to-analog (D/A) converter 90, an amplifier 98, a rebalance digital-to-analog (D/A) converter 91, an amplifier 99, and three full adjust potentiometers 94, 95, and 96. As with the potentiometers in empty reference circuitry 34, potentiometers 94, 95, and 96 could be replaced by suitable fixed voltage dividers.

Amplifier 38 may comprise an LF156 and serves as an inverting full reference amplifier means to generate a voltage that is opposite in phase to that provided by output 30 of excitation signal generator 26.

In the embodiment shown, D/A converters 90 and 91 may be 10 bit units, and each converter may comprise a 7520UD. Amplifiers 98 and 99, each of which may comprise an LF156, are used in conjunction with converters 90 and 91 respectively to provide a voltage output since 7520UD chips do not include an amplifier.

Converter 90 provides full set attenuation means and includes a plurality of second inputs 92 for receiving full set or attenuation control signals from microcomputer 25. Converter 90 provides predetermined attenuation dependent upon which second inputs 92 are enabled by the attenuation control signals.

Converter 91 provides reference means and includes a plurality of second inputs 93 for receiving rebalance approximation sequence control signals (sometimes termed rebalance control signals) from microcomputer 25. In a manner similar to converter 90, converter 91 provides predetermined attenuation dependent upon which second inputs 93 are enabled by the rebalance approximation sequence control signals.

Converters 73, 90, and 91 may be substantially identical. The attenuation provided by converters 90 and 91 may be understood by reference to corresponding explanation of converter 73.

Full adjust potentiometers 94, 95, and 96 correspond to tanks 21L, 21C, and 21R respectively and to full reference capacitors 100, 102, and 104 respectively.

Liquid Measurements

If a liquid measurement corresponding to a particular tank is being made, the current provided by full reference circuitry 36 will, upon completion of a rebalance approximation sequence discussed below, balance the current corresponding to the capacitance added by the liquid to the probe 22 or dielectric sensor 23 being monitored. During such a measurement, the current from full reference circuitry 36 is provided to the input of the appropriate amplifier through a full reference capacitor corresponding to the tank containing the probe or dielectric sensor of interest. The current provided by circuitry 36 is opposite in phase to the current provided by the probe 22 or dielectric sensor 23.

Accordingly, if a particular probe 22 in tank 21L is being monitored, the current provided to input 55L by full reference capacitor 100 will null the current provided to input 55L by the capacitance of the particular probe attributable to the liquid. Similarly, when the measurement is being made within tank 21C or 21R, the current provided to input 55C or 55R respectively by full reference capacitor 102 or 104 respectively will null the current provided by the particular probe or dielectric sensor capacitance attributable to the liquid.

Full Adjust Potentiometer 94, 95, and 96 Adjustment

As was previously indicated, during the initial set up of a system, each full adjust potentiometer (or other suitable voltage divider) is set (sized) to balance the current flowing through its corresponding full reference capacitor with the current that would flow through the probe 22 having the largest capacitance in the corresponding tank while the probe is fully wetted.

The adjustment is accomplished in a manner similar to that used for empty adjust potentiometers 74, 75, and 76. Each full adjust potentiometer is set so that the product of the full reference voltage provided by amplifier 38 and the capacitance of the corresponding full reference capacitor is equal to the product of the excitation signal voltage provided by excitation signal generator 26 and the fully wetted capacitance of the corresponding largest probe 22.

Accordingly, full adjust potentiometer 94 is set so that the product of the full reference voltage and the capacitance of full reference capacitor 100 is equal to the product of the excitation signal voltage and the fully wetted capacitance of the largest probe 22 in tank 21L. Similarly, full adjust potentiometer 95 and 96 are set so that the product of the full reference voltage and the capacitance of full reference capacitors 102 and 104 respectively are equal to the product of the excitation signal voltage and the fully wetted capacitance of the largest probe 22 in tanks 21C and 21R respectively.

Resistors 94A, 95A, and 96A serve the same purpose as resistors 74A, 75A, and 76A in empty reference circuitry 34. Similarly, thermistors 94B, 95B, and 96B (FIG. 3A) serve to provide compensation to offset the fixed-temperature coefficients of full reference capacitors 100, 102, and 104 respectively.

Rebalance Approximation Sequence

Whenever excitation multiplexer 44 selects the largest probe 22 in a tank for measurement, all second inputs 92 of full set D/A converter 90 are enabled so that converter 90 provides the full reference voltage without substantial attenuation. During such a measurement, the current flowing through the corresponding full reference capacitor will balance the current flowing through the corresponding probe having the largest capacitance while fully wetted.

However, if a measurement is being made on a probe 22 other than the largest capacitance probe or on a dielectric sensor 23, the current flowing through the corresponding full reference capacitor will be larger than the current corresponding to the fully wetted capacitance of the probe unless an appropriate attenuation is provided by full set D/A converter 90. Thus, whenever such a measurement is selected, microcomputer 25 provides appropriate attenuation control signals to second inputs 92, there being stored in a memory of microcomputer 25 a full set attenuation factor for each probe and dielectric sensor. With the appropriate attenuation enabled, the current provided to the corresponding amplifier input by the applicable full reference capacitor will null the current corresponding to the fully wetted capacitance of the probe 22 or dielectric sensor 23 of interest.

However, if a probe 22 is only partially wetted, or if a dielectric sensor 23 is immersed in a fuel of less than maximum dielectric constant (a partially wetted dielectric sensor 23 not being of interest), the current provided through the corresponding full reference capacitor will be too large to balance the current provided by the probe. Therefore, under such conditions, an additional attenuation is required in order to obtain a null at the input of the amplifier corresponding to the probe. This additional attenuation is obtained through rebalance D/A converter 91 which, as previously indicated, is controlled by rebalance approximation sequence control signals received through second inputs 93 from microcomputer 25.

In setting rebalance D/A converter 91, microcomputer 25 uses a successive approximation program to generate the rebalance approximation sequence control signals. Through the rebalance control signals, microcomputer 25 first enables only the most significant bit (MSB) of converter 91. As is further explained under the discussion of null threshold detector 71, if the current thus provided through the applicable full reference capacitor is larger than the current provided by the probe or dielectric sensor of interest, an output signal from null threshold detector 71 will be low, causing microcomputer 25 to disable the MSB. If the current provided by the applicable full reference capacitor is smaller than the current provided by the probe or dielectric sensor of interest, the output signal from null threshold detector 71 will be high, and microcomputer 25 will leave the MSB enabled.

This procedure is repeated for each of the remaining bits in rebalance D/A converter 91. At the conclusion of these steps, the current at the input of the applicable amplifier will be balanced to within the equivalent of one-half of the converter's least significant bit. The state of the converter's second inputs 93 (each input will be either a logic "1" or a logic "0") now defines a binary word. This digital information represents the capacitance added by the fuel to the probe or dielectric sensor being monitored and is used by microcomputer 25 in fuel volume and quantity determinations.

Reference Component Measurements

In addition to making liquid measurements on probes 22 and dielectric sensors 23 within tanks, full reference circuitry 36 is employed to make measurements on each of two reference components, a precision reference resistor 45 and a precision reference capacitor 42.

As with the probes 22 and dielectric sensor 23 in each tank, reference resistor 45 and reference capacitor 42 are each driven by excitation signal generator 26, and each have a corresponding input amplifier through which measurements are obtained. Amplifier 50 corresponds to reference resistor 45 while amplifier 46 corresponds to reference capacitor 42. Each of these amplifiers 50 and 46 are separately connected to input multiplexer 60 which, as previously indicated, selects one amplifier at a time for obtaining a measurement.

Figure 3A:
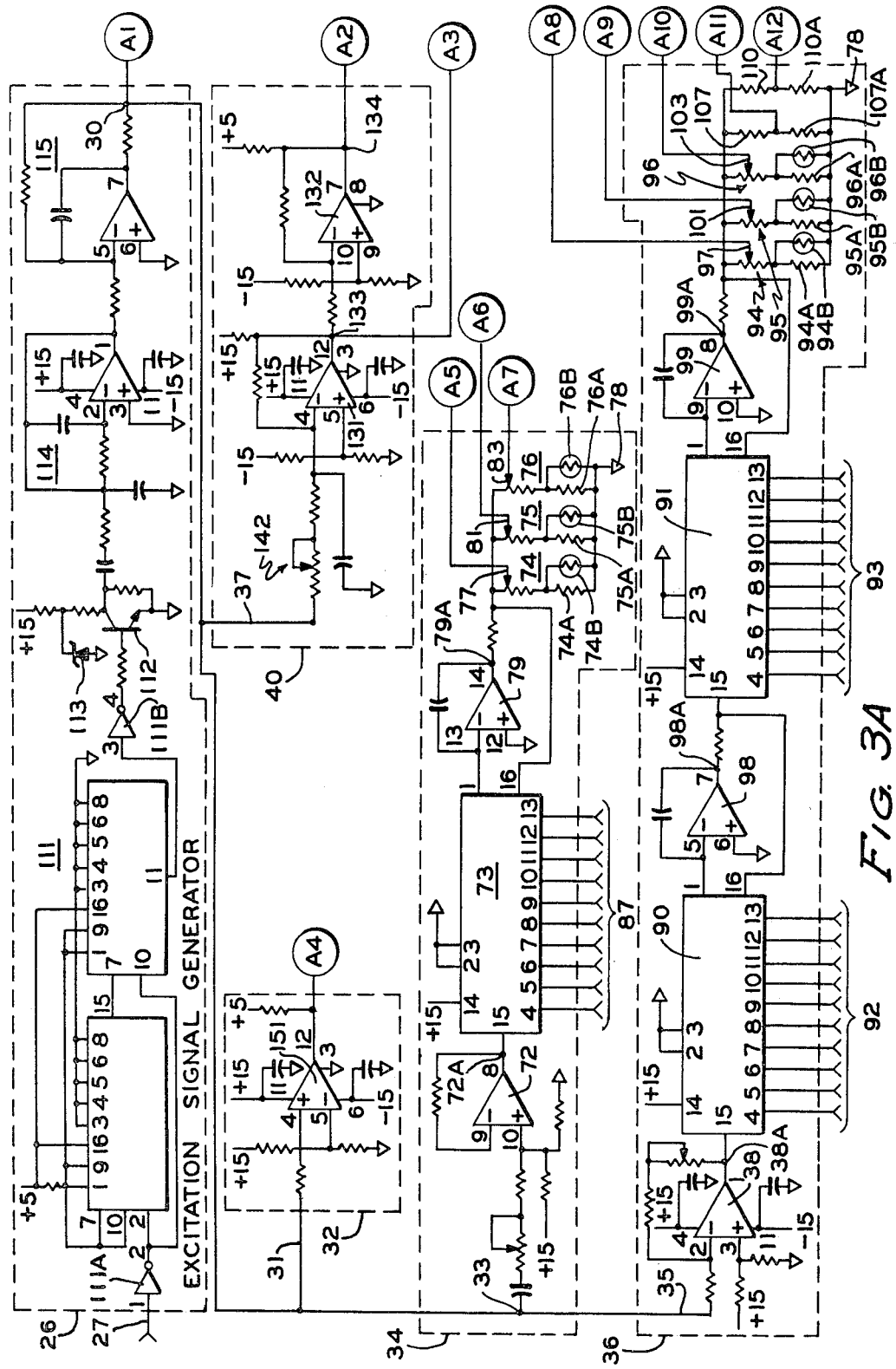
FIGS. 3A through 3E are schematic diagrams of the A/D electronics shown in FIG. 2.
Figure 3B:
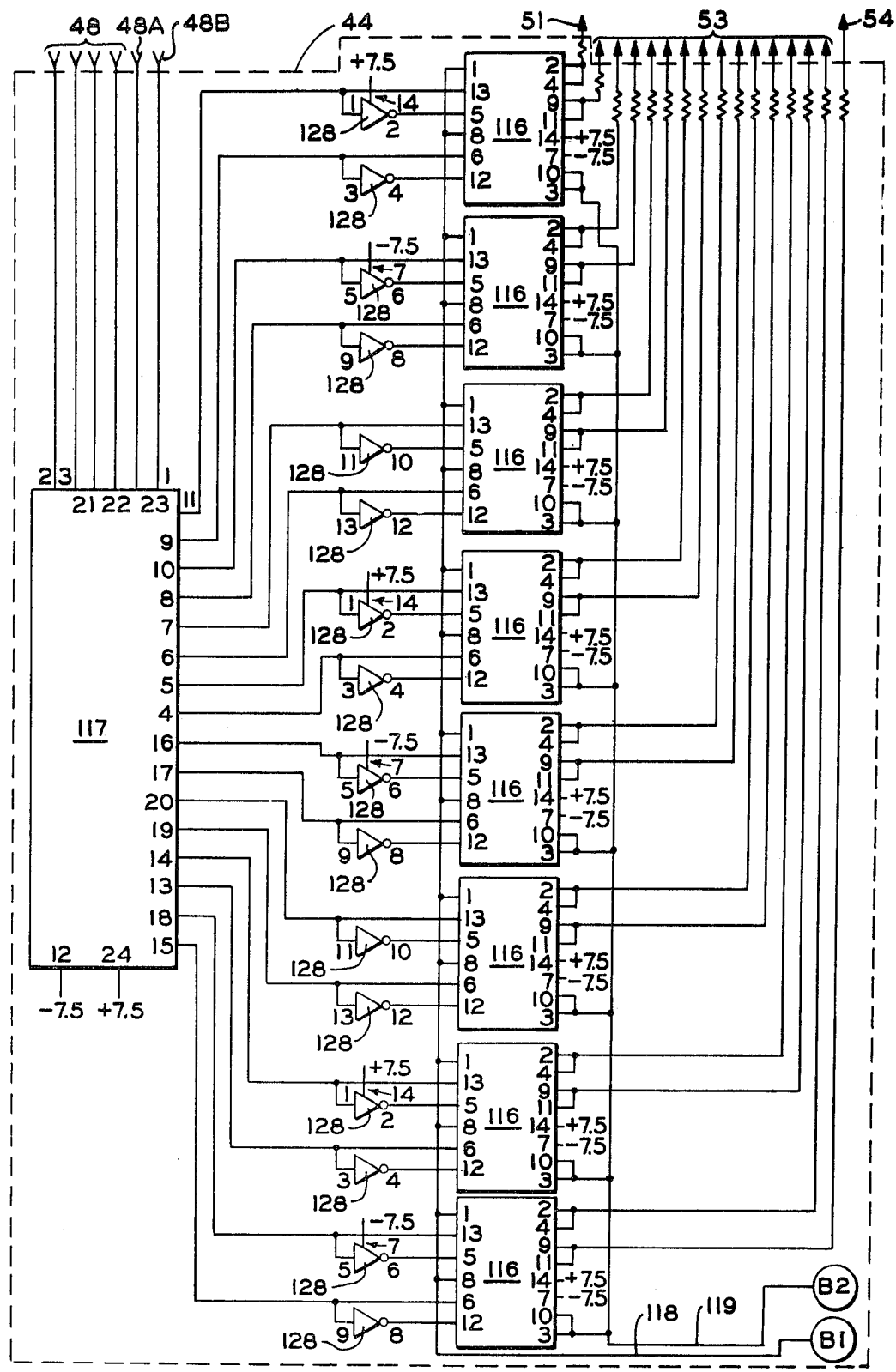
Figure 3C:
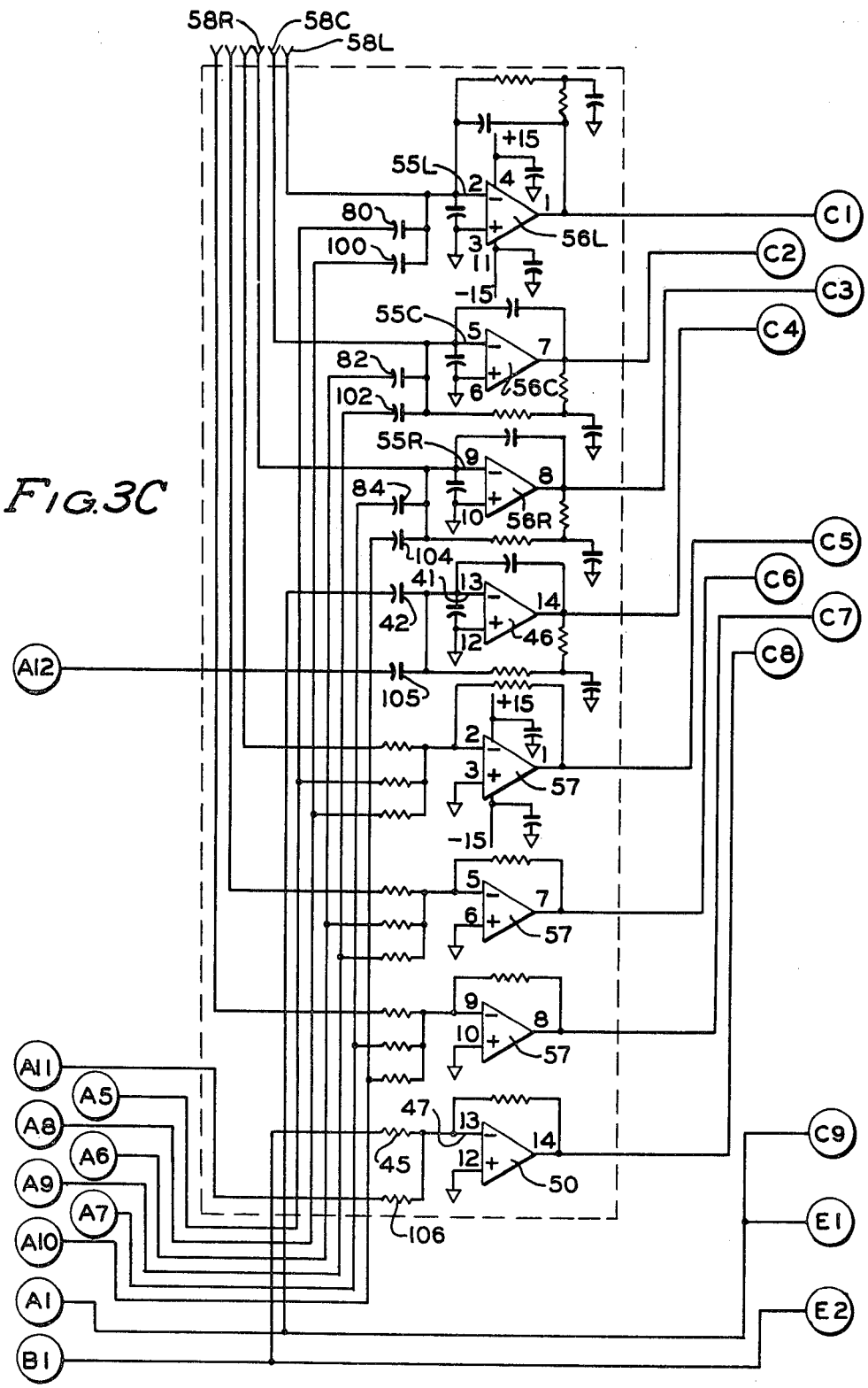
Figure 3D:
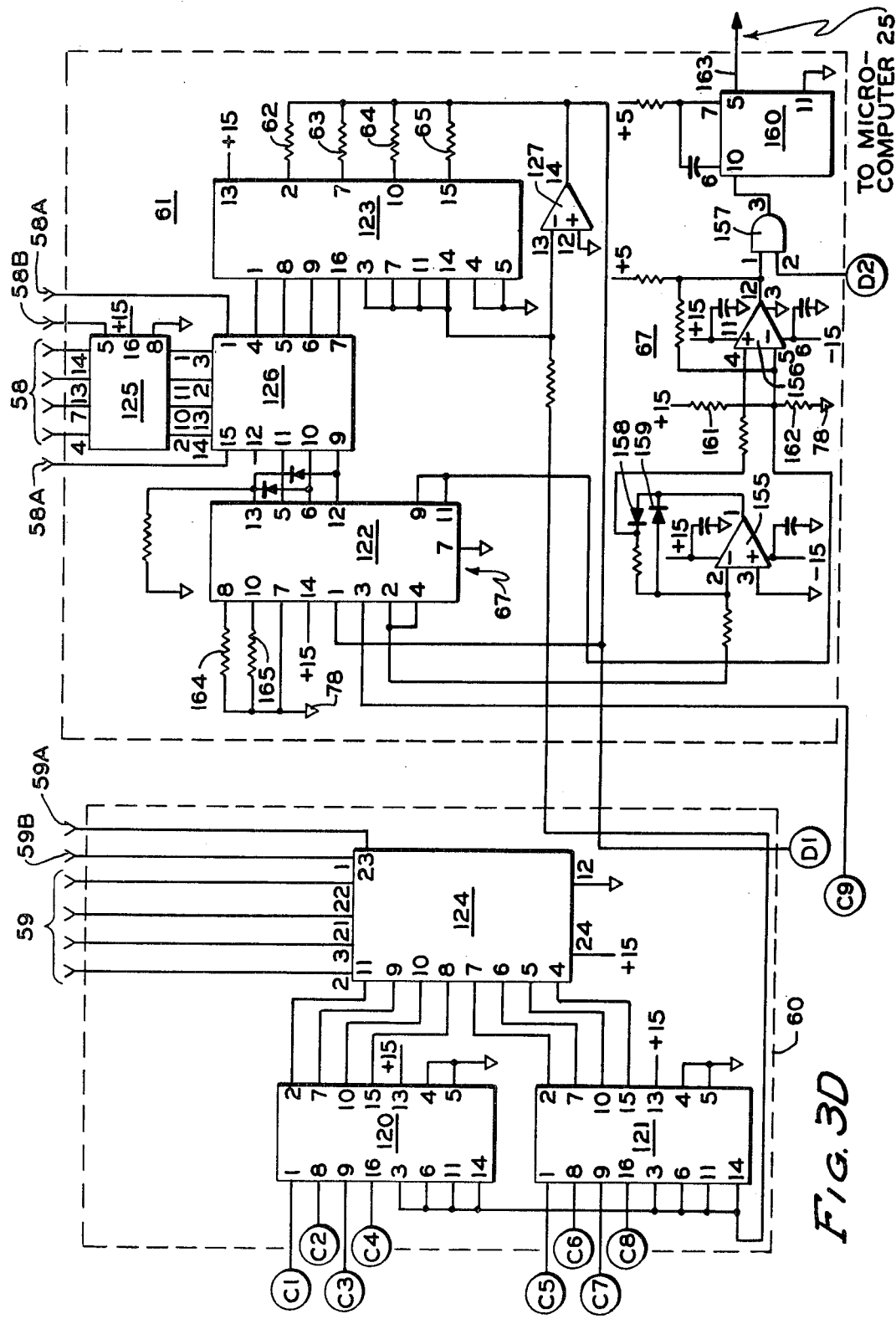

Measurements made on reference resistor 45 and reference capacitor 42 relate to system performance analysis. For example, by switching in reference resistor 45 and using null detection circuitry 68 to measure the current driven through reference resistor 45 by the excitation signal generator, the measurement obtained can be compared against a known standard stored in microcomputer 25. If the appropriate value is not obtained, it can be concluded that the excitation signal voltage level has shifted since a predetermined current through a precision resistor will provide a predetermined voltage level. In this manner, a primary check of the excitation signal level is made, and a secondary check of input multiplexer 60 and null detecting circuitry 68 is obtained. A test value related to whether the measured signal level is within predetermined limits of the known standard can be stored in microcomputer 25 for future reference. Storage for such a test value could comprise non-volatile memory 243 (FIG. 3F).

Similarly, after the null is obtained on the above measurement, the current through reference resistor 45 is measured through contamination monitor 67 as further discussed in connection with the explanation of the contamination monitor. In this manner, a primary check of the contamination monitor is made, and a secondary check of the excitation signal level is obtained.

Further by switching in reference capacitor 42 and using null detection circuitry 68 to measure the current through reference capacitor 42, the measurement obtained can be compared against a known standard stored in microcomputer 25. If the appropriate value is not obtained, it can be concluded that the frequency of the excitation signal provided by excitation signal generator 26 has shifted since a known current through a precision capacitor will provide a known frequency. In addition to being a primary check of the excitation signal frequency, this test is also a secondary check of input multiplexer 60 and null detecting circuitry 68. As in the case of measurements on reference resistor 45, a test value related to whether the measured signal level though the reference capacitor is within predetermined limits of the known standard can be stored in microcomputer 25 for future use.

As with measurements obtained through amplifiers 55L, 55C, and 55R, if a measurement is being made on reference resistor 45 or reference capacitor 42, the current provided by full reference circuitry 36 to the amplifier input of interest will be equal in magnitude but opposite in phase to the current provided to the input by the component of interest.

Accordingly, when a measurement is being made on reference resistor 45, the current provided by full reference circuitry 36 to input 47 of amplifier 50 will, upon completion of the rebalance approximation sequence, null the current provided by reference resistor 45 to input 47. Similarly, if a measurement is being made on reference capacitor 42, the current provided by full reference circuitry 36 to input 41 of amplifier 46 will null the current provided to input 41 by reference capacitor 42. The currents provided to input 47 may be provided directly from full reference circuitry 36 or as shown through a scaling resistor 106.

In the system embodiment shown, reference resistor 45 receives the excitation signal provided by excitation signal generator 26 through a switching means 43 while reference capacitor 42 receives the excitation signal directly from excitation signal generator 26.

Elimination of Empty Reference Circuitry 34

Empty reference circuitry 34 and its associated empty reference capacitors 80, 82, and 84 can be eliminated from the present system. However, in doing so, the size and, therefore, the precision of D/A converters 73, 90, and 91 must be considered. In the system as disclosed here, D/A converters 73, 90, and 91 and 10 bit units.

Eliminating empty reference circuitry 34 eliminates D/A converter 73 which is part of that circuitry. Therefore, in order to eliminate empty reference circuitry 34 while still maintaining the precision available from the present system as disclosed, D/A converters more precise than 10 bit units must be used for converters 90 and 91.

In addition, if empty reference circuitry 34 is eliminated, a stored value for the unwetted capacitance of each probe and dielectric sensor would normally be used to determine the capacitance added to a particular probe or dielectric sensor by liquid, the capacitance added by the liquid being the total wetted capacitance less the dry or unwetted capacitance. Such use of a stored value would replace the use of stored empty set attenuation factors used as previously explained to set the attenuation of empty set D/A converter 73 in circuitry 34.

Circumstances leading to a decision to eliminate empty reference circuitry 34 could involve, for example, having D/A converters with greater precision than 10 bit units becoming less expensive or having insufficient space available on system printed circuit boards for empty reference circuitry 34 and its associated empty reference capacitors.

If empty reference circuitry 34 is eliminated, the entire current necessary to balance the current provided by the probe 22 or dielectric sensor 23 of interest is provided by what is now full reference circuitry 36.

Unwetted Sensor Calibration

In operation of the illustrated embodiment of the system, the dry or unwetted capacitance of each probe 22 and dielectric sensor 23 is stored in memory and used in setting empty set D/A converter 73 through attenuation control signals. While each of these capacitance values could remain fixed throughout the life of the system, it is possible to provide for unwetted capacitance variations which may occur. For example, the unwetted capacitance of each essentially identical probe or dielectric sensor typically varies in dependence on manufacturing tolerances and typically relates to stray capacitance in the system.

Accordingly, during initial system set up or during overhaul of a system, the capacitance of one probe or dielectric sensor may vary from another essentially identical one. To avoid the effect of such variations, it is possible to have the present system read the dry or unwetted capacitance of each probe 22 and dielectric sensor 23 after installation in the system and to store these values in storage means such as non-volatile memory for use by the system. In this manner, an even more precise system can be insured.

Excitation Signal Generator 26

In the embodiment illustrated, excitation signal generator 26 develops a frequency stable low distortion 18.75 KHz sine wave excitation voltage from a 3.0 MHz digital input signal, the 3 MHz signal being derived in microcomputer 25 (see FIG. 3F).

The 3 MHz input signal is buffered by a 54S04 inverter 111A and counted down by a binary counter 111 to a frequency of 18.75 KHz. This frequency is then buffered by another 54S04 inverter 111B. Amplitude control is provided by a transistor 112, a zener diode 113, and associated resistors.

The resulting frequency-stable, amplitude-controlled square wave is converted to a low distortion sine wave by a two pole, Chebechev active filter 114. An amplifier 115 provides isolation for driving the probe 22 and dielectric sensor 23 capacitive loads.

Binary counter 111 may comprise a 54S162 and a 54S161, the former receiving the 3 MHz signal through a pin 2, the latter receiving the signal through a pin 10. Active filter 114 and amplifier 115 may each comprise an LF156.

Excitation Multiplexer 44

Excitation multiplexer 44 (FIG. 3B) is made up of 8 quad-CMOS analog switches 116, 16 inverters 128, and a 4-to-16 line decoder 117 comprising a 4-bit input latch and 6 inputs. Of these six inputs, four inputs 48 are for receiving the input latch code, one input 48A is for receiving an enable signal, and one input 48B is for receiving a strobe signal. These six inputs must be logic level compatible (+7.5 and −7.5 volts) with excitation multiplexer 44 logic levels. In the embodiment as illustrated in FIG. 3B, this would require level shifting between microcomputer 25 and the excitation multiplexer.

In the preferred embodiment shown, quad switches 116 each comprise a 4066B, inverters 128 each comprise a 4069, and line decoder 117 comprises a 14514.

Line decoder 117 converts a 4-bit latched input code provided by microcomputer 25 into one of sixteen discrete outputs. These outputs are used to control the excitation signals which appear on the output of switches 116 at lines 53, 54, and 51. These lines provide the excitation signal to selected probes 22, dielectric sensors 23, or load control select 52 respectively. An inhibit signal may be received by the enable input in order to allow all 16 inputs to be deselected.

For each combination of inputs received by the 4-bit input latch within decoder 117, one of the 16 outputs on line decoder 117 is selected. In the embodiment shown, each of the 16 outputs is connected to a quad switch 116 by a direct connection to either a control pin 13 or a control pin 6 on the switch and through an inverter 128 to a control pin 5 or a control pin 12 on the switch respectively.

Each quad switch 116 comprises four switches used in pairs, each pair being used to comprise a single-pole double-throw switch connected to a probe, a dielectric sensor, or load control select corresponding to each tank.

In the preferred embodiment, for each channel of A/D electronics 24 and, therefore, for each excitation multiplexer 44 in a system, the excitation multiplexer connects the excitation signal to one probe 22 in each tank or to the dielectric sensor 23 in each tank or load control select 52. In addition, multiplexer 44 concurrently connects all other probes or dielectric sensors or load control select not receiving the excitation signal to ground. For each channel of electronics 24, the excitation signal or ground is received through a line 118 or a line 119 respectively through an excitation and ground switching means 43 discussed below.

Whenever line decoder 117 is enabled and one of its sixteen outputs is selected, the selected output switches from a low state to a high state, thereby providing a logic high to the corresponding quad switch 116, the logic high being provided to either control pin 13 or control pin 6 on the switch. The logic high is also passed through an inverter 128 corresponding to the quad switch, thereby providing a logic low to the switch at either control pin 5 or control pin 12 respectively.

Whenever a control pin 13 on a quad switch 116 receives a logic high, the switch within quad switch 116 corresponding to pin 13 is closed, thereby providing the excitation signal through the switch to the corresponding probe 22, dielectric sensor 23, or load control select 52. At the same time, the switch corresponding to pin 5, which receives a logic low through an inverter 128, is opened, thus removing the component from its connection to ground. Conversely, if a control pin 13 receives a logic low and the corresponding pin 5 a logic high, the corresponding component will be grounded.

Similarly, whenever a pin 6 receives a logic high, the switch within quad switch 116 corresponding to pin 6 is closed, thereby providing the excitation signal to the corresponding probe 22, dielectric sensor 23, or load control select 51, and the switch corresponding to pin 12 simultaneously receives a logic low, thereby opening the switch and disconnecting the component from ground. If a control pin 6 receives a logic low and the corresponding pin 12 a logic high, the corresponding component will be grounded.

In this manner, the pair of switches corresponding to either pins 13 and 5 or pins 6 and 12 operate as single-pole double throw switches to either excite or ground each probe 22, dielectric sensor 23, or the load control select 52.

Excitation And Ground Switching Means 43

An excitation or ground switching means 43 may be included within a liquid gauging system comprising more than one channel of A/D electronics 24 in order to permit application of the excitation and ground signals from any of the system channels. Thus, if the excitation multiplexer 44 in one channel should fail, it would be necessary to have independent control of whether ground or excitation signals are being provided through the multiplexer. Each excitation and ground switching means 43 includes at least one switch for providing the excitation signal through line 118 and at least one switch for providing ground through line 119.

Figure 3E:
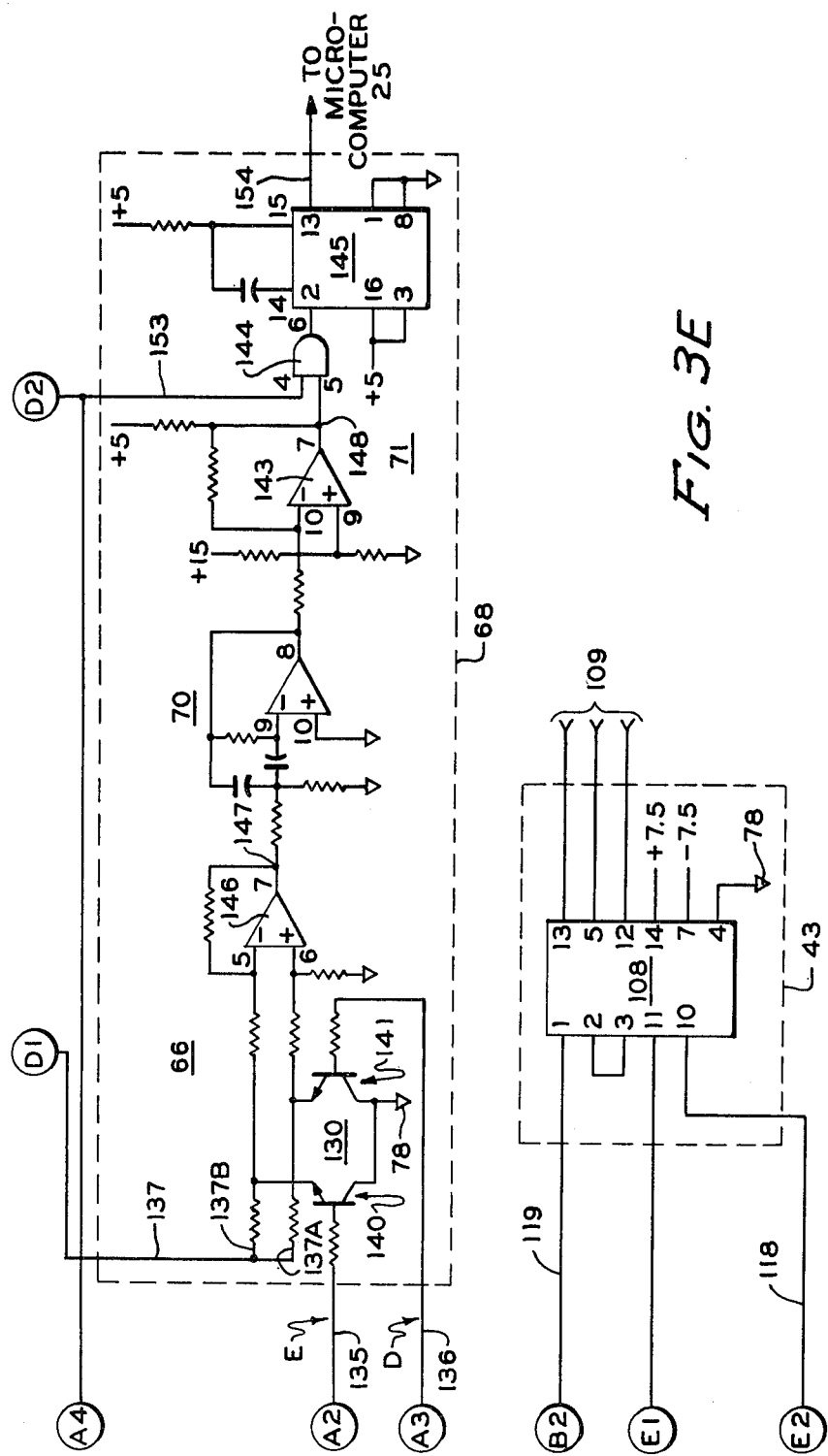
Figure 3F:
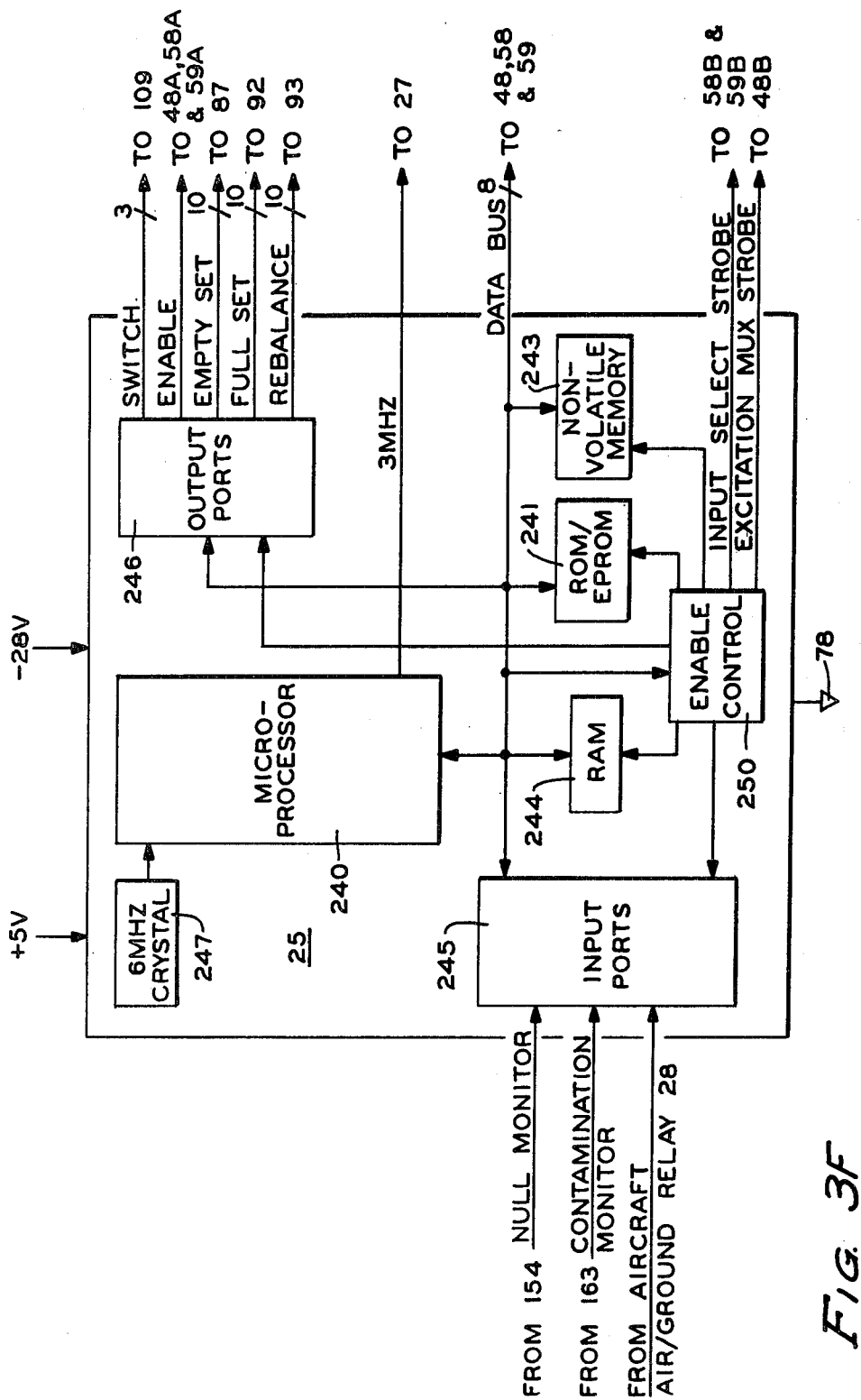
FIG. 3F is a block diagram of a microcomputer compatible with the present system.

In the configuration shown in FIG. 3E, switching means 43 comprises a single 4066B quad switch 108 comprising four switches. Of the four switches, one is used to control application of the excitation signal to line 118, two are used in series to apply application of ground to line 119, and one is not used.

Quad switch 108 is controlled through control signals received from microcomputer 25 through inputs 109. These three control inputs must be logic level compatible (+7.5 and −7.5 volts) with excitation multiplexer 44. In the embodiment illustrated, this would require level shifting these three signals from the microcomputer. Upon receipt of appropriate control signals through inputs 109, pins 1, 2, 3, and 4 within quad switch 108 are connected, thereby connecting line 119 to ground 78, (although not always numbered or discussed, the same symbol as used for ground 78 here is used for ground throughout this application). Similarly, upon receipt of appropriate excitation control signals, pins 10 and 11 are connected, thereby providing to line 118 the excitation signal received by quad switch 108 through pin 11.

Although excitation and ground switching means 43 is shown to comprise a single quad switch 108, that switch providing two series switches for application of ground and one switch for application of the excitation signal, it may be more appropriate to use separate chips for each switch. Using such an approach with each chip capable of independently providing the necessary control, all switching capability will not be lost in the event of failure of one chip.

Current-to-Voltage Input Amplifiers

As has been previously explained, eight input amplifiers, each of which may comprise an LF156, provide eight individual inputs to input multiplexer 60. Three of these amplifiers, 56L, 56C, and 56R, are used for liquid measurement inputs, amplifier 56L corresponding to tank 21L, amplifier 56C corresponding to tank 21C, and amplifier 56R corresponding to tank 21R. Two of the amplifiers, 50 and 46, relate to measurements on reference resistor 45 and reference capacitor 42 respectively. The remaining three amplifiers 57 are used for load select control 52 thumbwheel digit inputs.

In addition to providing a junction at which currents are nulled, a primary function of each of the eight amplifiers is to convert input currents, both capacitive and resistive, into a voltage for use in the null detecting part of A/D electronics 24. In the embodiment shown, the amplifiers also provide a 180 degree signal phase shift and serve as isolation between the probes and sensors of different tanks.

As can be seen from FIG. 3C, capacitive feedback is used for capacitive inputs and resistive feedback is used for resistive inputs. Such feedback maintains the required phase relationship between the input currents received at the amplifier inputs and the signals provided by the amplifiers. This phase relationship will be further discussed under the discussion of quadrature filter 66 and quadrature filter drivers 40.

Input Multiplexer 60

The function of input multiplexer 60 (FIG. 3D) is to facilitate the selection of particular measurements. Multiplexer 60 comprises two quad-BIFET switches 120 and 121 and a 4-to-16 line decoder 124 with a 4-bit latch.

Quad switches 120 and 121 may each comprise a 11202. Each quad switch 120 and 121 is used as four single-pole, single-throw switches.

Decoder 124, which may comprise a 14514, converts 4-bit coded input control signals received through four second inputs 59 into 8 discreet outputs. Input 59A is used to receive an enable signal, and input 59B is used to receive a strobe signal. The eight discreet outputs are used to select the particular tank or the component to be monitored.

Gain Scheduled Amplifier 61

At the same time that input multiplexer 60 selects a particular tank or component for measurement, gain scheduled amplifier 61 selects one of four gain resistors 62, 63, 64, or 65 for use in providing appropriate gain. The purpose of gain scheduled amplifier 61 is to maintain adequate sensitivity of the null detecting circuitry over a full range of input signal levels.

Amplifier 61, which shares some components with contamination monitor 67 discussed below, comprises a quad-BIFET switch 123, a quad latch 125, a dual 2-to-4 line decoder 126, and an inverting amplifier 127. As is also discussed below, quad switch 122 is a part of contamination monitor 67 and is not a direct part of gain scheduled amplifier 61.

Quad switch 123, which may comprise a 11202, serves to select one of the four gain resistors 62, 63, 64, or 65.

Quad latch 125, which may comprise a 4042, holds a 4-bit word composed of two bits for input signal select and two bits for gain select. The four bit word is in binary code and is received through second inputs 58 from microcomputer 25. Line decoder 126, which may comprise a 4555, is shown connected to quad latch 125 with 4 lines. Decoder 126 comprises two parts. One part uses two of the four connecting lines to obtain a two bit binary code associated with gain scheduled amplifier 61. Each of the four combinations within this two bit code (00, 01, 10, and 11) correspond to selecting one of the four line decoder output pins (4, 5, 6, or 7) applicable to the four gain resistors 62, 63, 64, and 65 within gain scheduled amplifier 61. Similarly, the other two connecting lines are used to obtain an alternate two bit binary code, each of the four combinations of the alternate code corresponding to one of the four line decoder output pins (9, 10, 11, or 12) applicable to contamination monitor 67, the operation of which is further discussed below. Thus, within the four bit input signal held by quad latch 125, two bits are used by line decoder 126 to control the operating mode of contamination monitor 67 as further explained below, and two bits control the gain of amplifier 61 through gain resistors 62, 63, 64, and 65. Input 58B of quad latch 125 receives a strobe signal. Inputs 58A of decoder 126 receive enable signals.

Amplifier 127, which may comprise an LF156, is used in conjunction with the four gain resistors to provide appropriate gain. Since the input to amplifier 127 is connected to an inverting input pin 13, amplifier 127 will invert signals amplified by it.

Null Detecting Circuitry 68

A section of null detecting circuitry 68 (FIG. 3E) has a primary purpose of detecting nulls at the input of the current-to-voltage input amplifier corresponding to the measurement being made. As will be explained further below, circuitry 68 comprises not only a null threshold detector 71 but also a quadrature filter 66 and a noise filter 70. Quadrature filter drivers 40 and monostable trigger 32 (FIG. 3A) also relate to the operation of circuitry 68.

Quadrature Filter 66

Quadrature filter 66 comprises a demodulator 130 and an amplifier 146. In the embodiment shown, demodulator 130 comprises two NPN bipolar transistors, and amplifier 146 comprises an LF156. Together with drivers 40, quadrature filter 66 filters the quadrature (resistive current) component of each liquid measurement signal in order to measure the true capacitive value of the signal.

For good quadrature rejection and precise detection of liquid measurement signals, drive signals received at inputs 135 and 135 must be in phase (or 180 degrees out of phase) with the liquid measurement signals received at input 137. In addition, the drive signals must have a 90 degree phase relationship with respect to the quadrature or resistive signal to be filtered.

Figure 4:
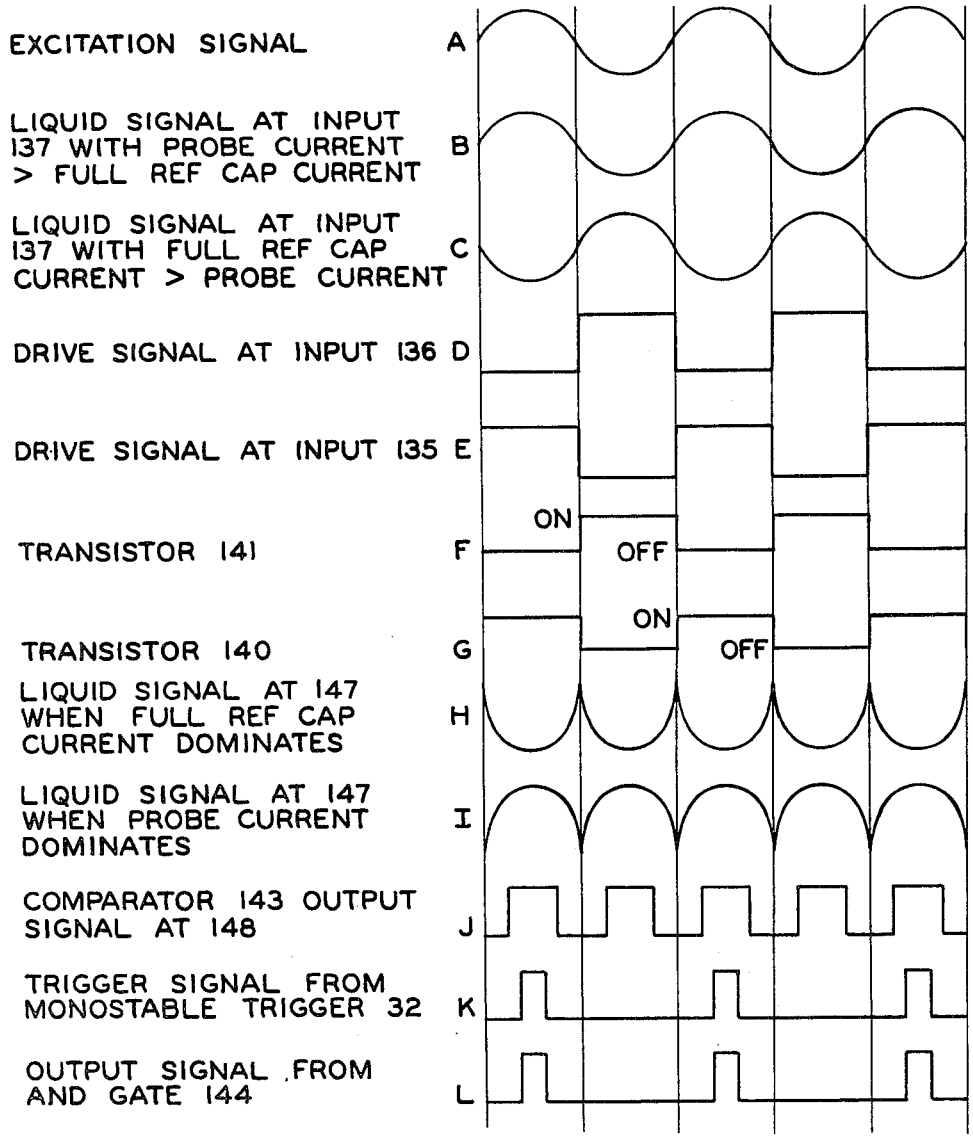
FIG. 4 illustrates various waveforms associated with the operation the A/D electronics shown in FIGS. 3A through 3E.

FIG. 4 illustrates the relationships of various waveforms involved with the operation of null detecting circuitry 68. Signal A in FIG. 4 represents the sine wave excitation signal provided by output 30 of excitation signal generator 26. With respect to the remaining signals, it will be recalled that a primary purpose of amplifiers 56L, 56C, and 56R is to convert a liquid measurement capacitive current signal into a voltage signal. After processing by gain scheduled amplifier 61, each such voltage signal is received at input 137 to null detecting circuitry 68.

As will be explained further below, whether a particular liquid measurement signal provided at input 137 to circuitry 68 is in phase with signal A or 180 degrees out of phase with signal A depends upon whether the capacitive current provided by a probe 22 or dielectric sensor 23 within a tank is greater than the current provided by a corresponding full reference capacitor.

If the current provided by the full reference capacitor is greater than the current provided by a probe or dielectric sensor, the voltage at input 137 will be 180 degrees out of phase with excitation signal A as shown at signal C. This is the case since, as previously explained, excitation signal A is inverted in full reference circuitry 36, since the current-to-voltage input amplifiers are inverting amplifiers, and since amplifier 127 is connected as an inverting amplifier.

Conversely, if the current provided by the probe or dielectric sensor is greater than the current provided by the corresponding full reference capacitor, the voltage signal provided at input 137 will be in phase with excitation signal A as shown at signal B. This is the case since the current-to-voltage input amplifiers are inverting amplifiers and since amplifier 127 is connected as an inverting amplifier.

With regard to the above explanation, it will be recognized that when excitation signal A passes through a probe, dielectric sensor, full reference capacitor, or other capacitive load, the capacitive current will lead the capacitive voltage by 90 degrees, thus causing a 90 degree phase relationship between excitation signal A and the capacitive current. However, after passing through the inverting current-to-voltage input amplifiers having capacitive feedback, the 90 degree lead of the capacitive current is eliminated. Therefore, for the sake of simplified explanation, these 90 degree phase shifts were eliminated from the previous 180 degree phasing discussions.

Quadrature Filter Drivers 40

Drive signals are received at inputs 135 and 136 (FIG. 3E) and are derived through operation amplifiers 131 and 132 within quadrature filter drivers 40 (FIG. 2A). Amplifier 131, which may comprise a 119, provides input 136 with a drive signal D which is substantially in phase with excitation signal A. Amplifier 131 is used in conjunction with a phase adjusting potentiometer 142. A phase adjustment through potentiometer 142 (FIG. 3A) is required since, in addition to the 90 and 180 degree phase shifts previously discussed, there will be some phase shift between excitation signal A and the liquid measurement signals received at input 137. Accordingly, potentiometer 142 is adjusted to obtain optimum quadrature rejection characteristics.

Amplifier 132, which may also comprise a 119, operates as an inverter and provides at input 135 a drive signal E which is 180 degrees out of phase with drive signal D.

In the operation of circuitry 68, whenever drive signal D received at the base of transistor 141 is positive, transistor 141 turns on and conducts any signal received in leg 137A to reference or ground 78. In this manner, whenever transistor 141 is on, signals received at input 137 are transmitted through leg 137B to pin 5 of amplifier 146. Pin 5 is an inverting input of amplifier 146.

Similarly, whenever signal E received at transistor 140 is positive, any signal received in leg 137B will be conducted to reference or ground 78. Therefore, whenever transistor 140 is on, signals received at input 137 will be transmitted through leg 137A to pin 6 of amplifier 146, pin 6 being a non-inverting input to amplifier 146.

Accordingly, when signals are received at input 137, they will be inverted whenever transistor 141 is on but will not be inverted whenever transistor 140 is on. Therefore, when signal C is received at input 137, a signal H will appear at output 1147 to amplifier 146. As can be seen, signal H is a negative full-wave rectified voltage. Similarly, when signal B is received at input 137, a signal I will appear at output 147. Signal I is a positive full-wave rectified voltage.

Consistent with the above, whenever the current provided by a full reference capacitor is greater than the current provided by a corresponding probe or dielectric sensor, a negative full-wave rectified signal H is provided at output 147 of amplifier 146. Conversely, whenever the current provided by a probe or dielectric sensor is greater than the current provided by a corresponding full reference capacitor, a positive full-wave rectified signal I appears at output 147.

Noise Filter 70

As was previously indicated, a noise filter 70 is incorporated within null detecting circuitry 68. In the embodiment shown, filter 70 comprises an LF156. Filter 70 is incorporated to filter not only noise per se but also low frequency fuel-slosh perturbations. Filter 70 is mechanized by means of a second-order bandpass active filter that has a natural frequency at approximately the 37.5 KHz frequency used for probe and dielectric sensor excitation. The amount of filtering that can be obtained through filter 70 is determined primarily by the system sampling time requirements.

Null Threshold Detector 71

In conjunction with circuitry previously discussed, null threshold detector 71 comprises a comparator 143, an AND gate 144, and a monostable multivibrator 145. Comparator 143 may comprise a 119, AND gate 144 a 54LS08, and monostable multivibrator 145 a 54LS123.

Monostable trigger 32 also relates to the operation of detector 71.

As was previously noted, liquid measurement signals at output 147 will either be in the form of signal H or signal I. Likewise, since noise filter 70 is incorporated to filter noise and fuel-slosh perturbations, liquid measurement signals appearing at the input to comparator 143 will also be substantially in the form of either signal H or signal I.

In the embodiment shown, comparator 143 is set to a positive threshold, the value of which is set to satisfy system sensitivity requirements, typically at a threshold just above zero. Since the pin 10 input to comparator 143 is an inverting input, when negative signal H appears at comparator 143, it will be inverted and will trigger the comparator if the incoming signal H has sufficient amplitude. Conversely, when positive signal I is received at comparator 143, it will be inverted to a negative signal and will not trigger the comparator.

When comparator 143 is triggered by an incoming negative signal, it will provide an output signal J at output 148. As long as comparator 143 is being triggered, output signal J will change states (low to high and back to low) at a repetition rate of 37.5 KHz, twice the 18.75 KHz frequency of the excitation signal provided by excitation signal generator 26. However, whenever a positive signal is received by the comparator or whenever the threshold of a negative signal is insufficient to trigger the comparator, output signal J will not appear, and a low state will remain at output 148.

Monostable Trigger 32

In order to facilitate the operation of circuitry 68, a trigger signal K (FIG. 4) is generated by a comparator 151 within monostable trigger 32 (FIG. 3A). In the embodiment shown, comparator 151 comprises a 119. The monostable trigger further comprises an input 31 driven by excitation signal generator 26. Since both trigger signal K and demodulator 130 drive signals D and E are generated directly from output 30 of excitation signal generator 26, and since the phasing of signals D and E is adjusted with potentiometer 142 as previously discussed, trigger signal K and demodulator output signal H are synchronous.

Trigger signal K and comparator output signal J are ANDED through AND gate 144. When signal K and signal J are at AND gate input pins 4 and 5 respectively, monostable vibrator 145 will be triggered by an output signal from AND gate 144, and a signal at monostable multivibrator output 154 will change from a low state to a high state. As long as both signal J and signal K are present at AND gate 144, the signal at output 154 will remain high. However, if a trigger pulse from AND gate 144 is not received within three cycles of demodulator output signal H, a timing circuit within monostable multivibrator 145 will time out, and the signal at output 154 will change from the high state to the low state.

The two-state signal at output 154 can now be related to setting rebalance D/A converter 91 through the successive approximation sequence previously described (see discussion under full reference circuitry 36). When a step in the successive approximation sequence causes demodulator output signal I to drop below the threshold of comparator 143 or causes signal H to appear, the signal appearing at comparator output 148 will go to a logic low and will no longer provide signal J to AND gate input pin 5, thus inhibiting the triggering of monostable multivibrator 145. Conversely, if a signal I having sufficient amplitude appears, monostable multivibrator 145 will be triggered and provide signal J.

Accordingly, for example, if in the preferred embodiment the current provided to a particular current-to-voltage amplifier input by a full reference capacitor is larger than the current provided to the amplifier input by the probe 22 or dielectric sensor 23 being monitored, the output signal at output 154 will be low. Conversely, if the current generated through a probe or dielectric sensor and provided to the corresponding amplifier input is greater than the current provided to the amplifier input by the applicable full reference capacitor, the signal at output 154 will be high.

In this manner, by monitoring the signal at output 154, microcomputer 25 can appropriately adjust rebalance D/A converter 91 and thereby seek a null in order to establish the value of the measurement being taken.

Contamination Monitor 67

Contamination monitor 67 (FIG. 3D) may be used to check two parameters. First, it can be used to determine probe or dielectric sensor contamination. The contamination measurement can be made at two levels, a first level indicating that the probe or sensor is becoming contaminated but is still usable and a second level indicating that the probe or sensor is no longer usable. In addition, contamination monitor 67 can be used in conjunction with reference resistor 45 to determine if the amplitude of the excitation signal provided by excitation generator 26 is above a predetermined level.

Contamination is directly proportional to the dissipation factor which is the resistive component of the current provided by a probe or dielectric sensor divided by the capacitive component of the current.

Contamination monitor 67, which shares some components with gain scheduled amplifier 61, comprises a quad latch 125, a dual 2-to-4 line decoder 126, a quad-CMOS switch 122, an amplifier 155, a comparator 156, an AND gate 157, and a monostable multivibrator 160. In the embodiment shown, quad latch 125 comprises a 4042, line decoder 126, a 4555, quad switch 122 a 4066B, amplifier 155 an LF156, comparator 156 a 119, AND gate 157 a 54LS08, and monostable multivibrator 160 a 54LS123. Recall that quad switch 123 is related to gain scheduled amplifier 61 and is not a direct part of contamination monitor 67.

A first threshold of comparator 156 is established with resistors 161 and 162. Each of two additional resistors 164 and 165 facilitate selection of two additional thresholds for comparator 156. As will be seen from the following explanation, the operation of contamination monitor 67 is much like that of null threshold detector 71.

Controlling the mode of operation of contamination monitor 67 relates to selecting predetermined pins within quad switch 122. The selection of these pins is accomplished through quad latch 125 and line decoder 126 as previously discussed in connection with gain scheduled amplifier 61.

In monitoring the amplitude of excitation signal generator 26, pin 5 of quad switch 122 is selected. This selection connects pin 3 and pin 4 of switch 122 and causes the excitation signal received at pin 3 to be transmitted out pin 4 and received at pin 2 of amplifier 155.

Amplifier 155 then produces a half wave rectified output signal synchronous with each cycle of the excitation signal. The half wave rectified output signal provided by amplifier 155 is received at pin 4 of comparator 156, the threshold of which is established by resistors 161 and 162.

Whenever the amplitude of the half wave rectified signal received at pin 4 of comparator 156 is sufficiently high, comparator 156 will provide an output signal similar to signal J (FIG. 4) but having half the frequency. That comparator output signal is then received at pin 1 of AND gate 157 and is ANDED with trigger signal K (FIG. 4) received at pin 2 of AND gate 157.

Thus, whenever the amplitude of the excitation signal is sufficiently high, there will be synchronous signals at pins 1 and 2 of AND gate 157 which will then trigger monostable multivibrator 160.

Multivibrator 160 will then provide at an output 163 a signal having a high state to indicate that the amplitude of the sine wave being provided by excitation signal generator 26 is sufficient. A test value related to whether the excitation signal has an amplitude above the predetermined threshold may then be stored in microcomputer 25 for future reference. Storage for such a test value could comprise non-volatile memory 243 (FIG. 3F).

Whenever a probe 22 or dielectric sensor 23 is being monitored for contamination, the capacitive current at the input of the corresponding current-to-voltage input amplifier is first nulled so that only the resistive (quadrature) component of the liquid measurement signal remains. Then, in order to monitor the resistive signal, the output of gain scheduled amplifier 61 (at pin 14 of amplifier 127) is transmitted to pin 2 of amplifier 155. This is accomplished by selecting either pin 6 or pin 12 of quad switch 122, each of these pins corresponding to one of the contamination levels previously discussed. Selecting either pin 6 or pin 12 also selects pin 13 of switch 122, thereby disconnecting pin 4 from pin 3 so that the excitation signal is no longer received at pin 2 of amplifier 155. The selection process also connects pin 1 and pin 2 of switch 122, thereby providing the signal from the probe or sensor to pin 2 of amplifier 155.

Amplifier 155 then provides a half wave rectified output signal synchronous with each cycle of the excitation signal. The half wave rectified output provided by amplifier 155 is received at pin 4 of comparator 156.

During the measurement of contamination, the threshold of comparator 156 is established not only by resistors 161 and 162 but also by either resistor 164 or 165. If pin 6 of switch 122 is selected, pin 8 and pin 9 of the switch are connected, thus putting resistor 164 in parallel with resistor 162 and establishing a first threshold for monitoring contamination. If pin 12 is selected, pin 10 and pin 11 are connected, thus putting resistor 165 in parallel with resistor 162 and establishing a second threshold for monitoring contamination.

Therefore, when monitoring contamination, if the resistive component of the liquid measurement signal is of sufficient amplitude to exceed the selected threshold of comparator 156, an output signal from comparator 156 will be simultaneously ANDED with trigger signal C. AND gate 157 will then trigger monostable multivibrator 160, thus causing monostable multivibrator 160 to provide at output 163 a signal having a high state and indicating that the contamination level corresponding to the threshold has been reached.

Accordingly, for the embodiment disclosed here, reaching a threshold during the measurement of contamination will indicate either that a particular probe or dielectric sensor is becoming contaminated but is still useful or that the probe or sensor is becoming overly contaminated and should no longer be used. As with the threshold measurements discussed in connection with the excitation signal level, a test value related to whether the quadrature signal has an amplitude above the applicable threshold can be then stored in microcomputer 25 for future reference. Storage for such a test value could comprise non-volatile memory 243 (FIG. 3F).

Lost Probe Recovery

If a fault is detected on a probe 22 or other sensor (e.g. a capacitive probe having zero capacitance or becoming overly contaminated and no longer useful), it is possible with the present system to recover a significant portion of the error that would normally be introduced by loss of the sensor. As can be noted in FIG. 7, the additional error caused by a lost probe begins when the probe is first wetted and increases to a maximum when the probe is totally immersed. The maximum additional error that results is equal to the percentage of the full tank liquid volume corresponding to the probe characterization which is operative. For characterizations 221-226 plotted on FIG. 7, the maximum error can be seen to range from approximately five to 20 percent.

In the present system, however, recovery from a lost probe can be relatively simple. For each probe in a tank, one or more sister probes may be utilized to estimate the wetted sensing length of a failed probe. Various techniques are made possible in the present system because individual wetted sensing lengths are known for all good probes.

As an example of a preferred approach to lost probe recovery in the present system two sister probes, S1 and S2, are identified for each probe in a tank. The two sister probes are used in estimating the failed probe's wetted sensing length through the wetted sensing lengths of the two sister probes. With the length and wetted sensing length (WSL) of each probe available from microcomputer 25, the estimated wetted sensing length of the lost probe (EST $WSL_{PROBE}$) can then be calculated using the formula EST $WSL_{PROBE} = LENGTH_{PROBE} \times (WSL_{S1} + WSL_{S2})/(LENGTH_{S1} + LENGTH_{S2})$.

More sophisticated methods are possible. For example, three sister probes that are partially wetted may be used to define a plane through three wetted sensing points. The estimated wetted sensing length for a failed probe can then be found as the intersection of the probe with the previously defined plane.

Microcomputer 25

Microcomputer 25, which is interconnected with A/D electronics 24 as shown in FIG. 3F, may comprise a standard 8-bit microprocessor 240 such as an Intel 8085A. Memory to store program instructions and tank characterization data can be provided through memory means 241 comprising a read only memory (ROM) such as an MK36000 or an electrically programmable read only memory (EPROM) such as a 2732. For non-volatile memory 243, an NMOS electrically-alterable read-only memory (EAROM) such as a General Instruments 2055 may be employed. Scratchpad memory may be provided through a random access memory (RAM) 244 such as a 2114. Input ports 245 may comprise a 54LS244, and output ports 246 may comprise a 54LS373. A 6 MHz crystal 247 may be used to derive the 3 MHz signal provided to input 27 of excitation signal generator 26. Crystal 247 may comprise a CTS Knight, Inc. MP060. Enable control 250 may comprise a 54LS138 and other gates and flipflops such as a 54LS74 and a 54LS00. In the present system, microcomputer 25 comprises storage means and determining means.

Probes 22

Figure 5A:
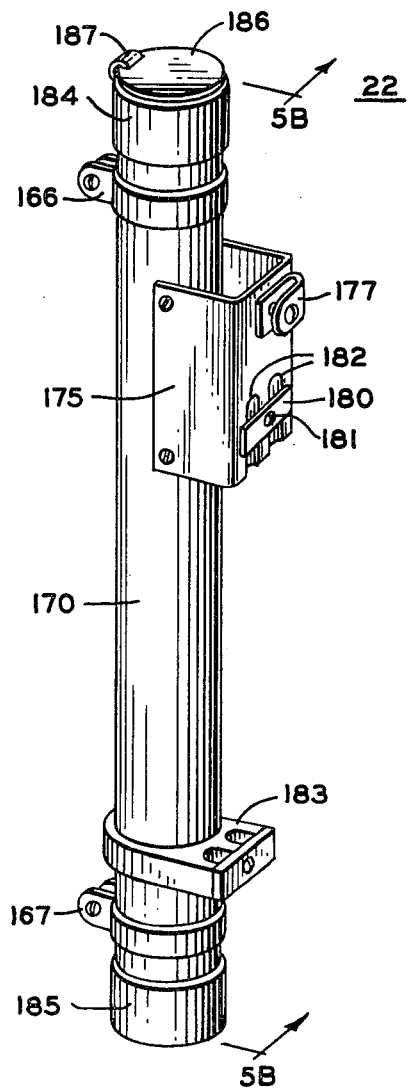
FIGS. 5A and 5B illustrate a physically uncharacterized probe compatible with the present system.
Figure 5B:
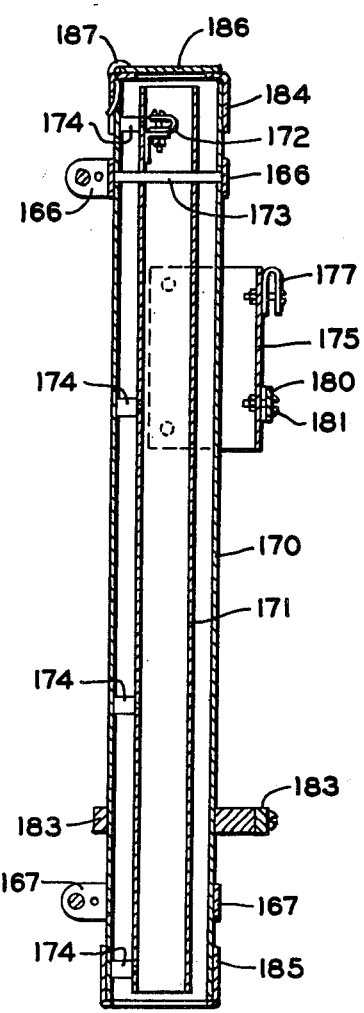
Figures 6A, 6B:
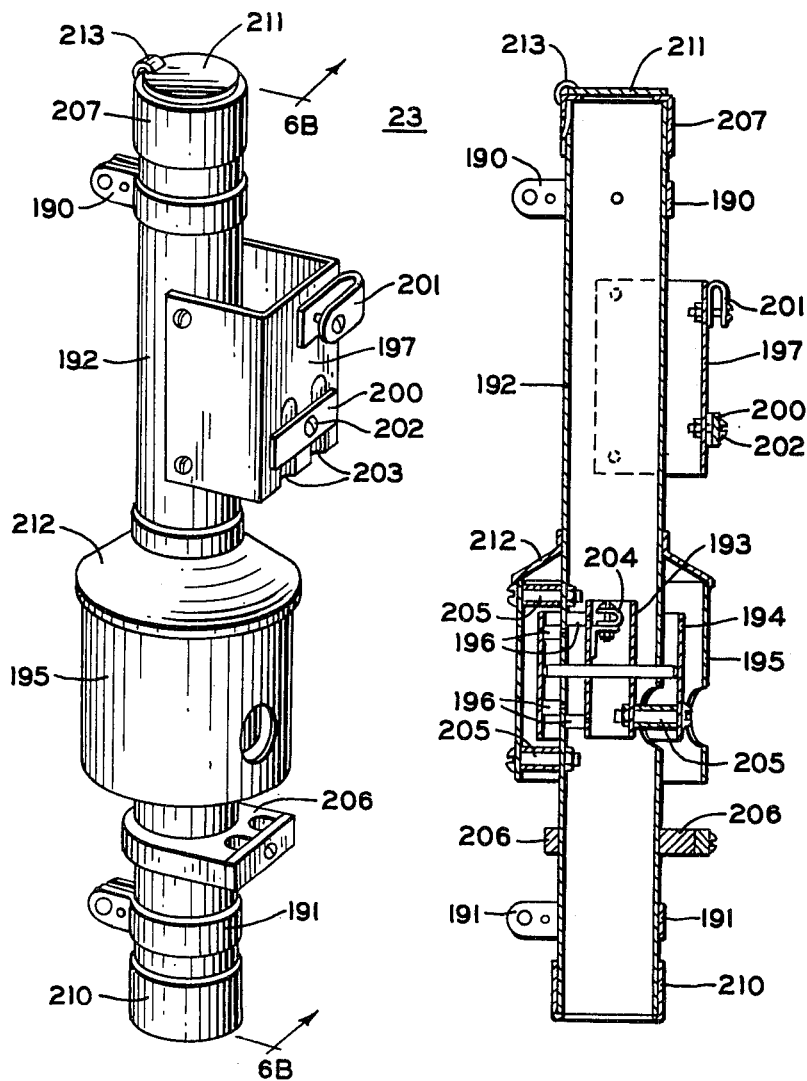
FIGS. 6A and 6B illustrate a dielectric sensor compatible with the present system.

As has been previously explained, probes 22 may be capacitance type sensors such as the one illustrated in FIGS. 5A and 5B or may be any type of probe compatible with the present invention. In addition, probes 22 may be replaced by any type of sensor for providing information relative to a liquid level or depth at a particular point in a tank. For example, probes 22 could be replaced with sensors which could determine the liquid level by reflections from the liquid surface, the reflections being received at one or more locations from within or outside of the tank.

Each probe in the present system is individually monitored in order to determine the wetted sensing length (WSL) or portion of the probe being wetted by liquid. With the wetted sensing length of each probe known, the level, volume or quantity of fuel in the tank can be determined.

In the case of capacitance type probes, determining the wetted sensing length of each probe is accomplished by measuring the capacitance of the probe and using that capacitance and the measured dielectric constant of the liquid to compute the wetted sensing length. The capacitance of a probe 22 will change due to both the portion of the probe length wetted by the liquid and the dielectric constant of the liquid. Accordingly, wetted sensing length may be computed using the formula $WSL = A(C_M - C_E)/(K-1)$, where $C_M$=measured probe wetted capacitance, $C_E$=empty or dry probe capacitance, $K$=liquid dielectric constant, and $A$=a constant relating to probe geometry and size.

A liquid height-volume study is typically conducted during the design of a particular system in order to select an optimum set of locations for the minimum number of probes in each tank. For example, for the system described here, fourteen probes were selected for each wing tank.

As was previously indicated, it is no longer necessary with the present system to use conventional capacitance type probes having the physical characterization typically required in prior art systems. Instead, a much simpler probe such as that shown in FIG. 5 may be used. The probe shown in FIG. 5 is substantially without physical characterization and has an essentially uniform capacitance per unit length. (Physically characterized probes may be used with the present system, however. In fact, prior art systems compatible with individual monitoring of physically characterized probes can be retrofitted with the present system in order to provide multiple characterization of each probe, thereby significantly increasing the accuracy of such systems). Obviously, many variations are possible, including sensing means other than probes.

An advantage of the simplified type of probe illustrated in FIGS. 5A and 5B is that it can be designed for a maximum commonality of parts between probes and with dielectric sensor 23. In the embodiment shown, each probe comprises an outer tube or electrode 170 and an inner tube or electrode 171. In aircraft fuel gaging applications, probes 22 typically range in length from approximately 3 to 80 inches. In the embodiment shown, mounting of each probe is provided through two Delrin brackets, an upper bracket 166 and a lower bracket 167. Both brackets 166 and 167 are shown to be captive on outer electrode 170. Upper bracket 166 may be designed to permit limited angular motion while lower bracket 167 may be designed to float vertically to provide for alignment tolerances in the aircraft mounting structure.

Inner electrode 171 is typically fabricated of stainless steel tubing having a 0.98 inch outer diameter by 0.015 inch wall thickness. A bracket 172 may be welded into the upper end of inner electrode 171 for making electrical connections to a high impedance lead.

Inner electrode 171 is typically supported in outer electrode 170 by a Teflon pin 173 that is captured by upper mounting bracket 166. Electrode spacing may be controlled by Teflon spacers 174 positioned uniformly along the length of the probe. The capacitance effect of spacers 174 may be adjusted for in computing the probe wetted sensing length.

In the preferred embodiment, outer electrode 170 provides a minimum spacing of 0.40 inch between electrodes 170 and 171. The tubing for outer electrode 170 may be of aluminum, typically 1.780 inches inside diameter by 0.020 inch wall thickness.

An anodized finish may be provided on outer electrode 170, and inner electrode 171 may be passivated and coated with approximately 0.0005 inch of polyurethane varnish.

A bracket 175 is shown riveted to outer elecrtrode 170 for lead wire strain relief supports and for low impedance leadwire termination via a terminal 177. A clamp 180 is typically used to support both the high and low impedance leadwires which may be run through heat shrinkable tubing provided near the terminal end of the leadwires.

Clamp 180, which may comprise a formed aluminum piece, is typically sized on one side of a mounting screw 181 to fit the high impedance leadwire and on the other side to fit the low impedance leadwire. Bracket 175 may also be formed to provide a channel 182 on each side of mounting screw 181, each channel being formed to capture one of the two leadwires.

In the embodiment shown, a strain relief support 183 is attached to outer electrode 170 to provide additional support for the leadwires and to prevent direct strain on bracket assembly 175. Support 183 may be a two piece molded plastic assembly with recesses to accept the two leadwires.

Each probe 22 may also comprise an upper end cap 184 and a lower end cap 185. Both end caps are typically fabricated of molded Delrin material. If used, the caps serve primarily to protect the probes and prevent them from contacting the top and bottom of the tank. Such contact might occur, for example, under conditions of tank flexing.

Lower end cap 185 typically encloses the end surface of outer electrode 170 but not the inner diameter of electrode 171. Such construction permits a maximum rate of level change in the tank without material difference in fuel level between the tank and the sensor. It also helps eliminate a build-up of contaminants.

Upper end cap 184 is shown comprising an integrally molded cover 186 that serves two purposes. The first purpose is to position and retain the high impedance lead going to terminal 172. The second purpose is to prevent contaminants and condensation from entering the space between the electrodes or the area of terminal 172. In the embodiment shown, cover 186 is mounted with an integrally molded hinge 187.

In order to maintain appropriate rate of level change of liquid within the probe, upper end cap 184 should be vented. The venting is preferably located on the vertical sides of the cap rather than in cover 186 so that contaminants and condensation are prevented from entering the probe.

Dielectric Sensor 23

Dielectric sensor 23 is a capacitance type sensor with the function of providing a measurement of the dielectric constant of the liquid. Because a liquid such as fuel in various tanks may vary in dielectric constant due to variables such as mixture and temperature, the system may include a dielectric sensor 23 in each tank for optimum system accuracy.

Dielectric sensor 23 is typically located near the bottom of the tank but above the level where water and contaminants will be a problem. In the preferred embodiment, the present system includes means to bypass the measurement of dielectric sensor 23 when the fuel level is below a level that would cause the sensor to become uncovered. When the latter condition exists, the latest valid measurement of dielectric constant may be used. If scratchpad data should be lost, a value of nominal dielectric constant stored in permanent data memory may be used.

Dielectric sensor 23 may be designed for maximum commonality of parts with probes 22. Electrical connections may be made in the same manner as with probes 22 connections, and mounting provisions may be essentially identical. In the embodiment shown, dielectric sensor 23 comprises an inner electrode 193 and second, third, and fourth electrodes 192, 194, and 195 respectively. Typically, the overall length of dielectric sensor 23 is approximately 12 inches. As shown, mounting is provided through two Delrin brackets, an upper bracket 190 and a lower bracket 191. Upper bracket 190 may permit limited angular motion and lower bracket 191 may float vertically to provide for alignment tolerances in the aircraft mounting structure.

Inner electrode 193 may be identical in diameter and wall thickness to a probe inner electrode 171. Inner electrode 193 may be stainless steel tubing having a 0.98 inch outer diameter and a 0.015 inch wall thickness. Second electrode 192 may be similar to probe outer electrode 170 to provide a minimum spacing of 0.40 inch between electrodes 192 and 193. The tubing of second electrode 192 may be aluminum having 1.780 inch inside diameter by 0.020 inch wall thickness. Similar tubing may be used for third electrode 194 and fourth electrode 195, which may have inside diameters of 2.61 inches and 3.44 inches respectively.

Electrode spacing is shown controlled by sets of Teflon spacers 196. The capacitance of spacers 196 may be adjusted for in computing fuel dielectric constant.

An anodized finish is typically provided on the outer three electrodes 192, 194, and 195, and inner electrode 193 may be passivated and coated with approximately 0.0005 inch of polyurethane varnish.

A bracket 197 may be riveted to second electrode 192 for a leadwire strain relief clamp 200 and for a low impedance leadwire terminal 201.

In the embodiment shown, leadwire strain relief clamp 200 is formed of aluminum and retained to bracket 197 by a screw 202. Bracket 197 may be formed with a channel 203 on each side of screw 202 to provide further support for the leadwires. At the points of contact with clamp 202 and channels 203, each leadwire is typically encased in a heat shrinkable tubing section provided near the terminal ends of the leadwires.

A high impedance leadwire terminal 204 is typically welded into the upper end of inner electrode 193 for making electrical connection to the high impedance leadwire.

Connections between the pairs of electrodes, inner electrode 193 to third electrode 194 and second electrode 194 to fourth electrode 195, may be made by metallic spacers 205.

A strain relief support 206 is shown attached to second electrode 192 in order to provide additional support for the leadwire assembly and to prevent direct strain on bracket 197. Support 206 is typically formed of a two piece molded plastic assembly with recesses to accept the two leadwires.

Each dielectric sensor 23 may be provided with an upper end cap 207 and a lower end cap 210, the end caps typically being of molded Delrin.

Lower end cap 210 typically will enclosed the end surface of second electrode tube 192 but will not extend into the inner diameter of electrode 192. This permits a maximum rate of level change in the tank without a material difference in liquid level between the tank and sensor 23. It also helps eliminate a build-up of contaminants.

Upper end cap 207 is shown to include an integrally-molded cover 211 that serves two purposes. The first purpose is to position and retain the high impedance leadwire going to terminal 204. The second purpose is to prevent contaminants and condensation from entering the space between electrodes or the area of terminal 204. In the embodiment shown, cover 211 is secured with an integrally molded hinge 213.

A molded plastic cover 212 is also shown and is used to protect the space between the outer three electrodes 192, 194, and 195 from contaminants and water condensation by enclosing the upper ends of these electrodes.

As was previously explained, the dielectric constant of the liquid measured by dielectric sensor 23 is used together with the measured probe capacitance to compute a wetted sensing length of each individual probe.

The dielectric constant obtained through dielectric sensor 23 may also be used to determine liquid or fuel density. Knowingly fuel density, one can determine fuel weight by multiplying density times fuel volume. Fuel density may be calculated using a relationship between dielectric constant and density as follows: $D=(K-1)/[A+B(K-1)]$, where D is the fuel density, K is the fuel dielectric constant, and A and B are constants used for a particular fuel type such as JP-4. As an alternative to determining liquid or fuel density through dielectric sensor 23, the density may be determined by any other density sensor meeting system accuracy requirements. An example of an alternate density sensor is disclosed in the previously-mentioned co-pending application entitled "Low Radiation Densitometer."

Software

Those skilled in the art will recognize that basic information theory derived from logical principles provides that all information no matter how complex can be represented by a collection of binary (yes or no) expressions. Within a microcomputer or other computer or digital device, such expressions are typically called "bits" and are typically stored in a memory in the form of "logical highs" each representing a logical "1" (e.g., "yes") and "logical lows" each representing a logical "0" (e.g., "no"). The memory storing such "logical highs" and "logical lows" is typically an apparatus comprising a predetermined array of gates or switches which are either opened or closed, an open switch typically representing a "logical low" (essentially 0 volts) in that location and a closed switch typically representing a "logical high" (e.g., 5 volts) in that location.

Accordingly, as those skilled in the art will also recognize, it is frequently semantical to distinguish between hardware and "software" since "software" normally is permanently stored in a hardware device such as a read only memory (ROM), thereby becoming a permanent portion of the device circuitry. In fact, virtually all "software" in the present system is permanently embodied in such hardware.

Microcomputer Characterization

Historically, probes comprising conventional gaging systems have been manufactured with individual physical characterizations causing them to output predictable although non-linear capacitance readings when they are wetted by fuel. These characterizations were typically calculated for a full set of all probes in a tank based on probe locations in the tank. Total capacitance of all probes in the tank was then related to fuel volume over the system range of tank pitch and roll attitudes.

Thus, in a typical prior art system, each probe contained one physical characterization which was derived from data encompassing all specified attitudes and volumes to be covered by the system. In addition, all probes in a tank were typically monitored together.

In contrast, the preferred embodiment of the present system permanently stores in a memory at least one characterization for each probe, with each probe being separately monitored for its own volume measurement contribution to the total volume or liquid in the tank. Further, the system is compatible with multiple characterizations of each probe so that, for example, each best fit of volume contribution data versus wetted sensing length can be related to specific portions of the specified volumes to be covered. As a result, highly precise fuel volume measurement is greatly facilitated.

Characterization is carried out in the present system by storing characterization data or parameter in the memory of microcomputer 25, there being at least one set of characterization parameters for each probe. In the system as disclosed, the characterization is carried out by subdividing each probe into theoretical sections or section lengths 230 (FIG. 8). Each particular section length relates to at least one characterization parameter which defines a relationship between a liquid depth and a value related to liquid quantity, e.g., in the preferred embodiment, a percentage of tank volume occupied by liquid if the particular section length is wetted by the liquid.

Many other variations are possible. For example, if the probes 22 disclosed in this application were to be replaced with sensors which, without being immersed, determine the liquid level or depth from reflections off the liquid surface, the level or depth measurements could be divided into predetermined increments analagous to the probe section lengths 23 disclosed here. Each particular increment, if within the depth measurement, could relate to at least one characterization parameter defining a relationship between a liquid depth and a value related to liquid quantity.

Each characterization parameter is typically based on tank shape and volume and on sensor location. In addition, each characterization parameter may be based on a physical condition related to orientation or attitude of the liquid surface in the tank. Examples of such physical conditions include gravity and acceleration vectors or forces, orientation or attitude of the tank, and orientation or attitude of the aircraft. Thus, in basing each characterization parameter on a physical condition related to orientation or attitude of the liquid surface in the tank, each parameter could be based on the nominal orientation of the liquid surface in the tank or on one or more of the above examples of physical conditions related to liquid surface orientation.

The computations necessary to determine the characterization parameters are typically performed on a large-scale, high-precision computer such as the Honeywell H-6080. In the case of aircraft fuel tanks, tank shape and volume data for such computations are typically obtained from aircraft manufacturers.

In operation of the system as disclosed, when a probe 22 is monitored, microcomputer 25 determines the wetted sensing length of the probe and then applies the appropriate characteristic data to obtain a percentage of tank volume contribution from the wetted sections. The sum of all tank units in a tank provides a measure of liquid volume as a percentage of total tank volume.

Figure 7:
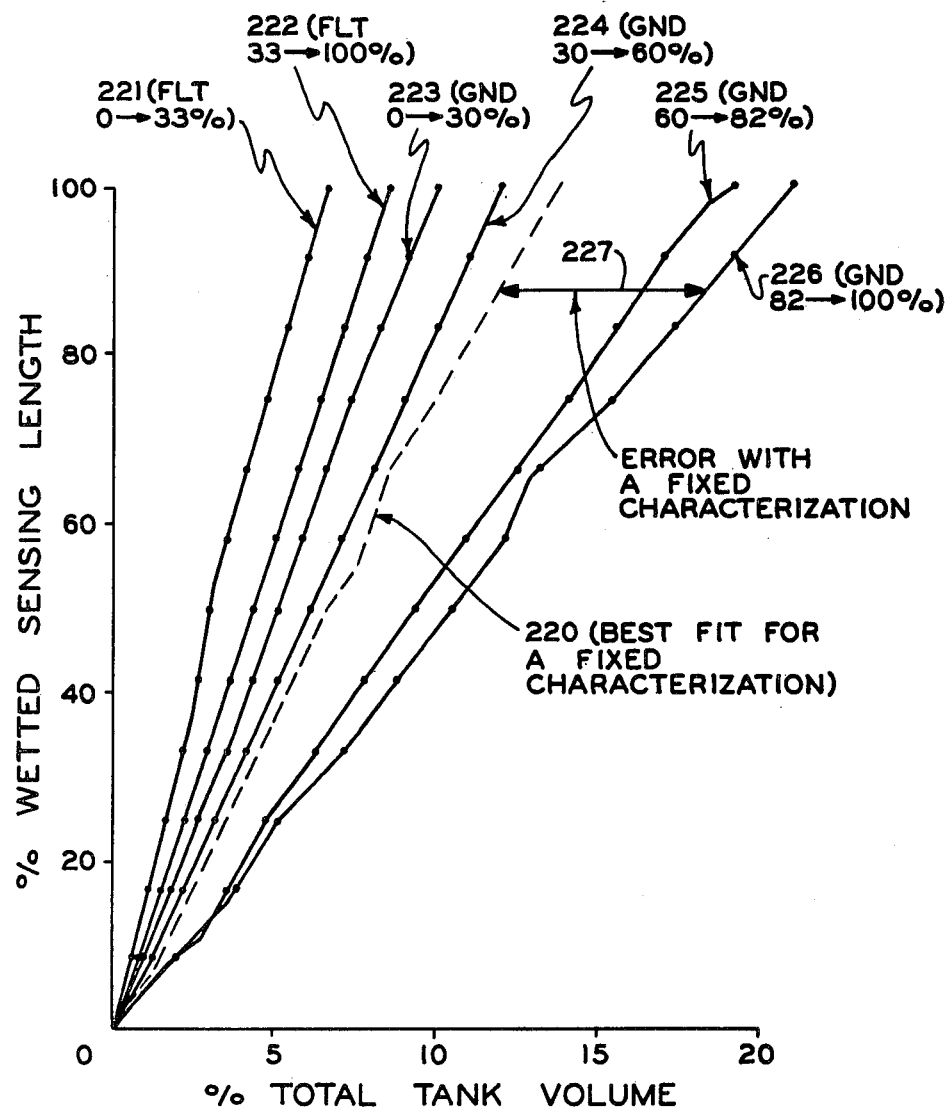
FIG. 7 compares six digital characterizations of a probe with a best fit fixed or physical characterization.

The present system is also compatible with multiple characterization of each probe. Such characterization may be understood by referring to FIG. 7 which is a plot having a vertical axis covering from zero to 100 percent of probe wetted sensing length and a horizontal axis depicting percent of total tank volume. A dotted plot 220 in FIG. 7 represents a fixed characterization probe typical of the prior art. The six solid plots, 221 through 226, are six characterizations for a single probe. Of the six characterizations, two characterizations (221 and 222) cover aircraft flight conditions with characterization 221 covering zero through 33 percent of full tank volume and characterization 222 covering 33 through 100 percent of full tank volume. Characterizations 223 through 226 cover aircraft ground conditions with characterization 223 covering zero through 30 percent of full tank volume, 224 covering 30 through 60 percent, 225 covering 60 through 82 percent, and 226 covering 82 through 100 percent. Since a tank unit having a fixed characterization 220 is limited to a "best fit" of multiple characterizations 221 through 226, a resultant error 227 can be substantial.

For each characterization 221 through 226, a plurality of points from unwetted (zero percent wetted sensing length) to completely wetted (100 percent wetted sensing length) may be stored as a set in a microcomputer memory lookup table 231 (FIG. 8). For wetted sensing lengths between the 12 points, an interpolation may be made. A 16-bit interpolation measurement provides an effective 0.025 percent interpolation accuracy.

As can be seen from FIG. 7, each of the characterizations 221 through 226 cover the full wetted sensing length (zero through 100 percent) of the particular probe being characterized. As can also be seen, each characterization covers only a predetermined range of total tank volume.

In the system as disclosed, either flight or ground characterization is selected through aircraft air/ground relay 28. It should be noted that such use of flight or ground characterization is only one of many possibilities of monitoring a physical condition related to an orientation that the liquid occupies in the tanks (in an aircraft, the shape and orientation of, for example, the wing tanks is affected by whether the aircraft is in the air or on the ground.)

In addition, each lookup table 231 comprising a particular characterization has a range of data meeting system accuracy specifications as well as data outside the specified range. Thus, once either flight or ground characterization is selected and computation is in progress, table 231 selections may be based on previously computed volumes. If the last computed volume is beyond the accuracy range for the selected characterization, the proper characterization (the proper lookup table 231) is selected for the next computation. If there has not been a previously computed volume (e.g., after powerup) a default table is selected for the first computation.

System Executive

A major task of the executive portion of the system software is controlling program sequence by considering logic conditions determined previously and initiating required operations.

Upon application of power, a microcomputer reset signal forces a program counter to a specific location from which a power on initialization sequence begins. Upon completion of system initialization, the system is placed in a fuel weight computation mode and fuel weight computation begins for each tank. After all tank computations have been made, indicators may be updated by a display program.

Computation of the percentage of total tank volume measured by each probe is outlined in FIG. 8. As was previously indicated, each probe 22 is divided into theoretical sections 230. As was also previously indicated, volumes (expressed as a percent of total tank volume) corresponding to each section are stored in lookup tables 231 in memory, there being for each probe a lookup table for each characterization such as 221 through 226.

During the process of determining the percentage of total tank volume measured by each probe, the wetted sensing length of each probe is computed (as was previously indicated under the discussion of probes 22) from the measured capacitance added to the probe by the fuel and from the dielectric constant of the fuel. With reference to the computed wetted sensing length for a particular probe, the section 230 wetted section lengths are then summed, and corresponding section volumes are summed.

When a total of section 230 wetted sensing lengths exceeds the computed wetted sensing lengths for a probe, an interpolation is made to find the wetted sensing length of a partially wetted section. The interpolation factor is applied to the corresponding section volume in order to determine the corresponding partial section volume attributable to the partially wetted section. The partial section volume is then added to the previous sum in order to arrive at the total tank volume contribution corresponding to the particular probe. After filtering, each probe volume is then added to find total tank volume.

Because tank volume computed at this point is a percentage of full tank volume, actual fuel volume is computed by multiplying the percentage of full tank volume times maximum tank volume. Total fuel weight may then be computed by multiplying fuel volume times density.

The computation of fuel volume and weight as described above is accomplished in the present system by using several subfunction softwave modules permanently embodied in memory means 241 (FIG. 3F). A program design language pseudo-code for the computation is listed in Table I below.

Table I

DO FOR EACH TANK
  RESET TANK VOLUME (%) TO ZERO
  READ DIELECTRIC CONSTANT
  DO FOR EACH PROBE 22
    SET PROBE 22 VOLUME (%) TO ZERO
    READ PROBE 22 CAPACITANCE
    COMPUTE WSL ($WSL_M$)
    SET TOTAL WSL TO ZERO
    DO UNTIL TOTAL WSL GREATER THAN $WSL_M$
      ADD SECTION WSL TO TOTAL WSL
      ADD SECTION VOLUME (%) TO PROBE 22 VOLUME
    ENDDO
    COMPUTE WSL OF PARTLY WETTED SECTION
    COMPUTE INTERPOLATION FACTOR
    ADD PARTIAL SECTION VOLUME (%) TO PROBE 22 VOLUME
    FILTER PROBE 22 VOLUME (%)
    ADD PROBE 22 VOLUME (%) TO TANK VOLUME (%)
  ENDDO
  COMPUTE TOTAL TANK VOLUME (GALLONS/LITERS)
  STORE VOLUME
  OBTAIN DENSITY
  COMPUTE TANK FUEL WEIGHT
  STORE TANK FUEL WEIGHT
  FILER TANK FUEL WEIGHT
  STORE FILTERED TANK FUEL WEIGHT
ENDDO

In order to obtain each fuel dielectric reading and in order to read each probe 22, appropriate multiplexer switches are selected. In addition, for each measurement, two 10-bit values representing empty and full set adjustments are output to empty and full set D/A converters 73 and 93 respectively. Microcomputer 25 then uses successive approximation logic as previously described to output values to rebalance D/A converter 91 in order to appropriately null the current from the sensor or probe being monitored. The program design language pseudo-code for this process is listed in Table II below.

Table II

OUTPUT MULTIPLEXERS 44 AND 60 SELECTOR VALUES
OUTPUT EMPTY SET ADJUST TO D/A CONVERTER 73
OUTPUT FUEL SET ADJUST TO D/A CONVERTER 90
OUTPUT GAIN AMPLIFIER 61 AND CONTAMINATION MONITOR 67
SETTINGS TO LATCH 125
DO UNTIL NUMBER OF BITS TESTED EQUALS 10
  INSERT TEST BIT INTO APPROXIMATE VALUE
  OUTPUT APPROXIMATE VALUE TO D/A CONVERTER 91
  READ OUTPUT OF NULL THRESHOLD DETECTOR 71
  IF OUTPUT IS HIGH
    KEEP TEST BIT
  ELSE
    DISCARD TEST BIT
  ENDIF
ENDDO
TEST FOR REASONABLENESS

Filtering

In the present system, software may be used to filter individual probe 22 readings, fuel weight values, and display values. Individual probe 22 readings may be averaged with an average of previous readings for that probe. This running average helps smooth out extreme readings that can result from such things as fuel slosh.

Fuel weight values may be filtered by using a weighted average. For example, a new fuel weight may be given a weighting factor of 0.25, and the old fuel weight may be given a weighting factor of 0.75. Adding these two quantities will give a weighted average for the fuel weight that approximates a filter with a 3.5 second time constant. This value may then be processed through an algorithm to prevent least significant bit flicker on a display. This smoothed value becomes the displayed value and the old fuel weight value.

Data may be sent serially to a conventional indicator through conventional drive electronics. A 16-bit format may be used, and the data may be in binary coded decimal (BCD) form. One bit may be used for the hundreds digit with four bits each used for the tens, units, and the tenths digits. The sixteen bits may be arranged as follows: the first bit may always by a 1, the second bit may be a display bit (for dual display indicators), the next thirteen bits may be data for the indicator, and the last bit may be a parity bit (e.g., odd parity).

The embodiments of the invention in which an exclusive property or right is claimed are defined as follows:

1. In a liquid gaging system, an apparatus for monitoring a quadrature signal from a capacitive sensor, comprising:
   a capacitive sensor for providing a liquid measurement signal related to a liquid in a tank, the liquid measurement signal comprising a capacitive signal and a quadrature signal; and
   means for monitoring the quadrature signal through null detection of the capacitive signal, the null detection being implemented through a successive approximation sequence, the means for monitoring being connected to the sensor.

2. The apparatus of claim 1 wherein the means for monitoring comprises a quadrature filter.

3. The apparatus of claim 2 wherein the quadrature filter comprises a demodulator.

4. The apparatus of claim 2 wherein the means for monitoring further comprises:
   threshold detector means for determining whether the quadrature signal has an amplitude above a predetermined threshold, the threshold detector means being connected to the quadrature filter; and
   means for storing a test value related to whether the quadrature signal has an amplitude above the predetermined threshold, the means for storing being connected to the threshold detector means.

5. The apparatus of claim 4 wherein the means for storing comprises a non-volatile memory for storing a digital number related to the stored value.

6. The apparatus of claim 4 wherein the threshold detector means comprises resistor means for establishing the predetermined threshold.

7. The apparatus of claim 2 wherein the means for monitoring further comprises:

threshold detector means for determining whether the quadrature signal has an amplitude above a first predetermined threshold and for determining whether the quadrature signal has an amplitude above a second predetermined threshold, the threshold detector means being connected to the quadrature filter; and means for storing a first test value related to whether the quadrature signal has an amplitude above the first predetermined threshold and for storing a second test value related to whether the quadrature signal has an amplitude above the second predetermined threshold, the means for storing being connected to the threshold detector means.

8. The apparatus of claim 7 wherein the means for storing comprises a non-volatile memory for storing a digital number related to the first stored value and for storing a digital number related to the second stored value.

9. The apparatus of claim 7 wherein the threshold detector means comprises first resistor means for establishing the first predetermined threshold and second resistor means for establishing the second predetermined threshold, there being means for connecting the first resistor means to the second resistor means.

10. The apparatus of claim 9 wherein the means for connecting comprises switching means for selecting one of the first resistor means and the second resistor means, the switching means being connected to the threshold detector means.

11. The apparatus of claim 1 wherein the means for monitoring comprises:
threshold detector means for determining whether the quadrature signal has an amplitude above a predetermined threshold; and
means for storing a test value related to whether the quadrature signal has an amplitude above the predetermined threshold, the means for storing being connected to the threshold detector means.

12. The apparatus of claim 11 wherein the means for storing comprises a non-volatile memory for storing a digital number related to the stored value.

13. The apparatus of claim 11 wherein the threshold detector means comprises resistor means for establishing the predetermined threshold.

14. The apparatus of claim 1 wherein the means for monitoring comprises:
threshold detector means for determining whether the quadrature signal has an amplitude above a first predetermined threshold and for determining whether the quadrature signal has an amplitude above a second predetermined threshold; and
means for storing a first test value related to whether the quadrature signal has an amplitude above the first predetermined threshold and for storing a second test value related to whether the quadrature signal has an amplitude above the second predetermined threshold, the means for storing being connected to the threshold detector means.

15. The apparatus of claim 14 wherein the means for storing comprises a non-volatile memory for storing a digital number related to the first stored value and for storing a digital number related to the second stored value.

16. The apparatus of claim 14 wherein the threshold detector means comprises first resistor means for establishing the first predetermined threshold and second resistor means for establishing the second predetermined threshold, there being means for connecting the first resistor means to the second resistor means.

17. The apparatus of claim 16 wherein the means for connecting comprises switching means for selecting one of the first resistor means and the second resistor means, the switching means being connected to the threshold detector means.

18. The apparatus of claim 1, 11 or 14 wherein the capacitive sensor comprises a capacitive probe having an essentially uniform capacitance per unit length.

19. The apparatus of claim 1, 11, or 14 wherein the capacitive sensor comprises a dielectric sensor.

20. In a liquid gaging system, an apparatus for selectively monitoring individual sensors one at a time for a quadrature signal, comprising:
a plurality of capacitive sensors, each sensor providing a liquid measurement signal related to a liquid in a tank, each liquid measurement signal comprising a capacitive signal and a quadrature signal; and
means for selectively monitoring individual sensors one at a time for the quadrature signal, the means for selectively monitoring being connected to the sensors.

21. The apparatus of claim 20 wherein the means for selectively monitoring comprises means for selectively monitoring through null detection of the capacitive signal, the null detection being implemented through a successive approximation sequence.

22. The apparatus of claim 21 wherein the means for selectively monitoring further comprises a quadrature filter, the quadrature filter and the means for selectively monitoring through null detection being interconnected.

23. The apparatus of claim 22 wherein the quadrature filter comprises a demodulator.

24. The apparatus of claim 22 wherein the means for selectively monitoring further comprises:
threshold detector means for determining whether a particular quadrature signal has an amplitude above a predetermined threshold, the threshold detector means being connected to the quadrature filter; and
means for storing a test value related to whether the particular quadrature signal has an amplitude above the predetermined threshold, the means for storing being connected to the threshold detector means.

25. The apparatus of claim 24 wherein the means for storing comprises a non-volatile memory for storing a digital number related to the stored value.

26. The apparatus of claim 24 wherein the threshold detector means comprises resistor means for establishing the predetermined threshold.

27. The apparatus of claim 22 wherein the means for selectively monitoring further comprises:
threshold detector means for determining whether a particular quadrature signal has an amplitude above a first predetermined threshold and for determining whether the particular quadrature signal has an amplitude above the second predetermined threshold, the threshold detector means being connected to the quadrature filter; and
means for storing a first test value related to whether the particular quadrature signal has an amplitude above the first predetermined threshold and for storing a second test value related to whether the particular quadrature signal has an amplitude above the second predetermined threshold, the means for storing being connected to the threshold detector means.

28. The apparatus of claim 27 wherein the means for storing comprises a non-volatile memory for storing a digital number related to the first stored value and for storing a digital number related to the second stored value.

29. The apparatus of claim 27 wherein the threshold detector means comprises first resistor means for establishing the first predetermined threshold and second resistor means for establishing the second predetermined threshold, there being means for connecting the first resistor means to the second resistor means.

30. The apparatus of claim 29 wherein the means for connecting comprises switching means for selecting one of the first resistor means and the second resistor means, the switching means being connected to the threshold detector means.

31. The apparatus of claim 21 wherein the means for selectively monitoring further comprises:
threshold detector means for determining whether a particular quadrature signal has an amplitude above a predetermined threshold, the threshold detector means being connected to the means for selectively monitoring through null detection; and
means for storing a test value related to whether the particular quadrature signal has an amplitude above the predetermined threshold, the means for storing being connected to the threshold detector means.

32. The apparatus of claim 31 wherein the means for storing comprises a non-volatile memory for storing a digital number related to the stored value.

33. The apparatus of claim 31 wherein the threshold detector means comprises resistor means for establishing the predetermined threshold.

34. The apparatus of claim 21 wherein the means for selectively monitoring further comprises:
threshold detector means for determining whether a particular quadrature signal has an amplitude above a first predetermined threshold and for determining whether the particular quadrature signal has an amplitude above the second predetermined threshold, the threshold detector means being connected to the means for selectively monitoring through null detection; and
means for storing a first test value related to whether the particular quadrature signal has an amplitude above the first predetermined threshold and for storing a second test value related to whether the particular quadrature signal has an amplitude above the second predetermined threshold, the means for storing being connected to the threshold detector means.

35. The apparatus of claim 34 wherein the means for storing comprises a non-volatile memory for storing a digital number related to the first stored value and for storing a digital number related to the second stored value.

36. The apparatus of claim 34 wherein the threshold detector means comprises first resistor means for establishing the first predetermined threshold and second resistor means for establishing the second predetermined threshold, there being means for connecting the first resistor means to the second resistor means.

37. The apparatus of claim 36 wherein the means for connecting comprises switching means for selecting one of the first resistor means and the second resistor means, the switching means being connected to the threshold detector means.

38. The apparatus of claim 20 wherein the means for selectively monitoring comprises:
threshold detector means for determining whether a particular quadrature signal has an amplitude above a predetermined threshold; and
means for storing a test value related to whether the particular quadrature signal has an amplitude above the predetermined threshold, the means for storing being connected to the threshold detector means.

39. The apparatus of claim 38 wherein the means for storing comprises a non-volatile memory for storing a digital number related to the stored value.

40. The apparatus of claim 38 wherein the threshold detector means comprises resistor means for establishing the predetermined threshold.

41. The apparatus of claim 20 wherein the means for selectively monitoring comprises:
threshold detector means for determining whether a particular quadrature signal has an amplitude above a first predetermined threshold and for determining whether the particular quadrature signal has an amplitude above the second predetermined threshold; and
means for storing a first test value related to whether the particular quadrature signal has an amplitude above the first predetermined threshold and for storing a second test value related to whether the particular quadrature signal has an amplitude above the second predetermined threshold, the means for storing being connected to the threshold detector means.

42. The apparatus of claim 41 wherein the means for storing comprises a non-volatile memory for storing a digital number related to the first stored value and for storing a digital number related to the second stored value.

43. The apparatus of claim 41 wherein the threshold detector means comprises first resistor means for establishing the first predetermined threshold and second resistor means for establishing the second predetermined threshold, there being means for connecting the first resistor means to the second resistor means.

44. The apparatus of claim 43 wherein the means for connecting comprises switching means for selecting one of the first resistor means and the second resistor means, the switching means being connected to the threshold detector means.

45. The apparatus of claim 20, 38, or 41 wherein at least one of the capacitive sensors comprises a capacitive probe having an essentially uniform capacitance per unit length.

46. The apparatus of claim 20, 38, or 41 wherein at least one of the capacitive sensors comprises a dielectric sensor.

* * * * *